(12) United States Patent
DiMartino

(10) Patent No.: US 12,522,974 B2
(45) Date of Patent: Jan. 13, 2026

(54) PORTABLE DRYING SYSTEM AND METHOD OF USING SAME

(71) Applicant: William D. DiMartino, New Bern, NC (US)

(72) Inventor: William D. DiMartino, New Bern, NC (US)

( * ) Notice: Subject to any disclaimer, the term of this patent is extended or adjusted under 35 U.S.C. 154(b) by 762 days.

(21) Appl. No.: 17/898,970

(22) Filed: Aug. 30, 2022

(65) Prior Publication Data
US 2023/0139448 A1 May 4, 2023

Related U.S. Application Data

(60) Provisional application No. 63/275,173, filed on Nov. 3, 2021.

(51) Int. Cl.
*D06F 59/04* (2006.01)
*F26B 9/00* (2006.01)

(52) U.S. Cl.
CPC .............. *D06F 59/04* (2013.01); *F26B 9/003* (2013.01)

(58) Field of Classification Search
CPC ......... F26B 9/003; F26B 21/083; D06F 59/04
USPC .......................................................... 34/104
See application file for complete search history.

(56) References Cited

U.S. PATENT DOCUMENTS

| | | | | |
|---|---|---|---|---|
| 5,406,717 A * | 4/1995 | Dofka | ..................... | D06F 59/04 34/239 |
| 5,604,993 A * | 2/1997 | Auckerman | .......... | F26B 21/008 392/382 |
| 5,720,108 A * | 2/1998 | Rice | ........................ | D06F 59/04 34/104 |
| 6,085,436 A * | 7/2000 | Peet | ........................ | D06F 59/04 34/106 |
| 6,499,227 B1 * | 12/2002 | Jacobson | ................ | D06F 59/04 34/106 |
| 7,716,849 B1 * | 5/2010 | Hicks | ...................... | D06F 59/04 34/106 |
| 7,895,768 B2 * | 3/2011 | Vossoughi | .............. | A47L 19/00 15/118 |
| 8,726,534 B2 * | 5/2014 | Chappell | ................ | F26B 9/003 34/232 |
| 10,865,514 B2 * | 12/2020 | Schwab | ................ | F26B 21/008 |
| 11,952,708 B1 * | 4/2024 | Henry | ..................... | F26B 9/003 |
| 2009/0100699 A1 * | 4/2009 | Hasler | ..................... | D06F 59/04 34/106 |
| 2023/0139448 A1 * | 5/2023 | DiMartino | ............ | F26B 21/008 34/104 |

FOREIGN PATENT DOCUMENTS

CA 2921689 A1 * 9/2017
KR 2133131 B1 * 7/2020

* cited by examiner

*Primary Examiner* — Stephen M Gravini
(74) *Attorney, Agent, or Firm* — Ward and Smith, P.A.; Ryan K. Simmons

(57) ABSTRACT

A portable drying system. The portable drying system may include a base plate; one or more holder frames disposed on a first side of the base plate, wherein each of the one or more holder frames may define an airflow channel therethrough, each airflow channel may extend through the base plate; and an attachment mechanism, wherein the attachment mechanism may be configured to attach the portable drying system to another structure.

21 Claims, 46 Drawing Sheets

PORTABLE DRYING SYSTEM AND METHOD OF USING SAME

RELATED APPLICATIONS

This application is related and claims priority to U.S. Provisional Patent Application No. 63/275,173, entitled "Portable Drying System and Method of Using Same" filed on Nov. 3, 2021, the application of which is incorporate herein by reference in its entirety.

TECHNICAL FIELD

The subject matter of the invention relates generally to drying mechanisms and more particularly to a portable drying system and method of using same.

BACKGROUND

In certain activities, articles of clothing may get wet effecting comfort and/or performance. For example, in golf, a golfer's golf glove may get wet due to rain, sweat, and/or retrieving golf balls from water hazards, wet areas, and the like. Continuing the golf example, it may take a significant amount of time for a wet golf glove to air dry. Consequently, the golfer may be forced to play a significant portion of the round using the wet or damp golf glove, which may adversely affect the glove performance and/or comfort of the wearer. Currently, there is no convenient and effective way to dry, for example, a wet or damp golf glove while play is in progress.

SUMMARY

In one embodiment, a portable drying system is provided. The portable drying system may include a base plate; one or more holder frames disposed on a first side of the base plate, wherein each of the one or more holder frames may define an airflow channel therethrough, each airflow channel may extend through the base plate; and an attachment mechanism, wherein the attachment mechanism may be configured to attach the portable drying system to another structure. The attachment mechanism may include an adjustable clamp devise, which may be generally C-shaped. The one or more holder frames may be generally circular in shape. The one or more holder frames may include one or more cut out portions about a periphery thereof. The one or more holder frames may be configure to receive a glove thereon. The base plate may further include a first attachment mating portion, and wherein the first attachment mating portion may be configured to engage with a corresponding one of a second attachment mating portion of the attachment mechanism. The first attachment mating portion may include first locking features, and wherein the first locking features may be configured to engage with corresponding ones of second locking features of the second attachment mating portion, and wherein when the first locking features may be engaged with the corresponding ones of the second locking features, the first attachment mating portion and the second attachment mating portion may be locked in place relative to one another, and when the first locking features are not engaged with the corresponding ones of the second locking features the first attachment mating portion and the second attachment mating portion may be rotatable about one another. The first locking features may include one of dimples or bumps and the second locking feature may include the other of the one of corresponding dimples or bumps, and wherein the dimples or bumps may be arranged in a circular line. The system may further include a fan mount body, wherein the fan mount body may be disposed on a second side of the base plate opposite that of the one or more holder frames, and wherein a rear portion of the fan mount body may be at least partially open and configured to receive a blower fan. The system may further include one or more of a blower fan, a heater, and/or a light. The blower fan may be attached to the fan mount body and configured to supply airflow to each airflow channel of the one or more holder frames. The system may further include a power source for providing power to one or more of the blower fan, heater, and/or light. The power source may include at least one of a battery pack and/or a remote power source. The system may further include a controller, wherein the controller may be configured to control the operations of one or more of the power source, blower fan, heater, and/or light. The fan mount body may further include a first attachment mating portion, and wherein the first attachment mating portion is configured to engage with a corresponding one of a second attachment mating portion of the attachment mechanism. The system may further include a desiccant pack holder, wherein the desiccant pack holder is arranged in proximity to the airflow channels of the one or more holder frames.

In another embodiment, a method of using a portable drying system is provided. The method may include providing a portable drying system. The portable drying system may include a base plate; one or more holder frames disposed on a first side of the base plate, wherein each of the one or more holder frames define an airflow channel therethrough, each airflow channel extending through the base plate; and an attachment mechanism, wherein the attachment mechanism may be configured to attach the portable drying system to another structure. The method may further include attaching the portable drying system to a structure; and installing one or more articles to be dried on the one or more holder frames. The method may further include activating a blower fan, wherein the blower fan may be attached to the portable drying system and configured to supply airflow to the airflow channels of the one or more holder frames.

BRIEF DESCRIPTION OF THE DRAWINGS

Figure 1:
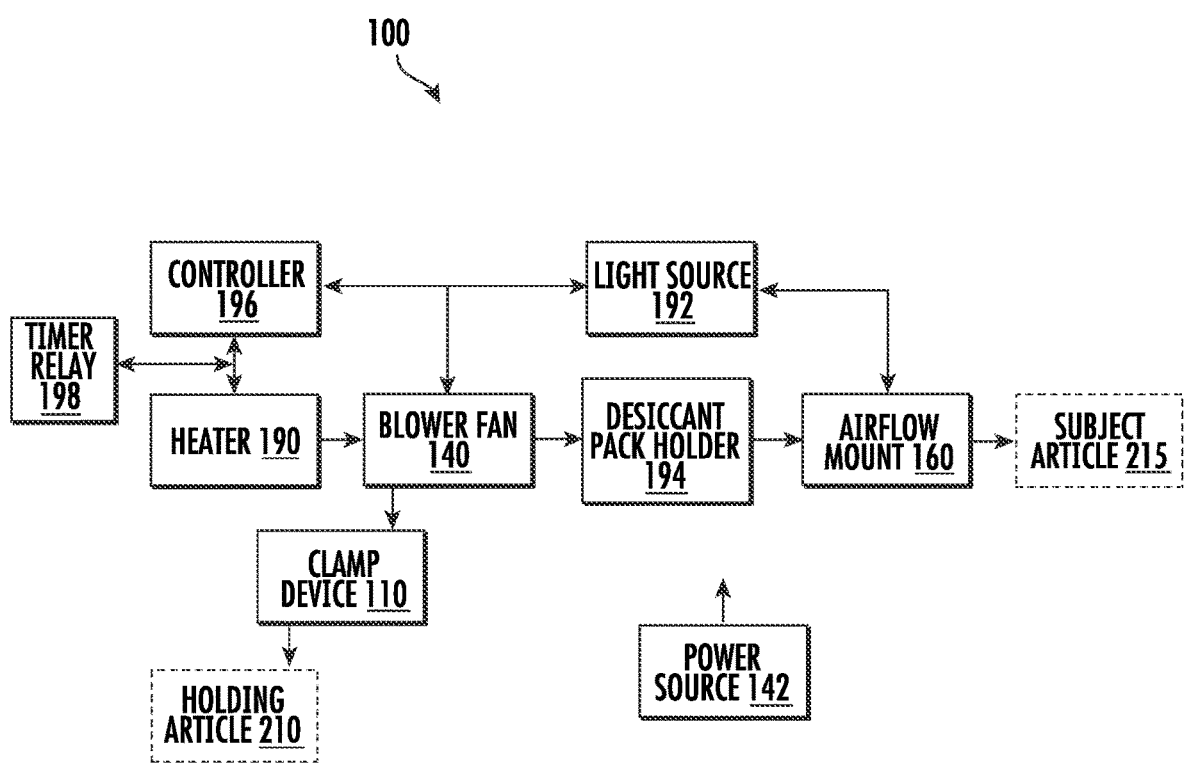
Figure 2:
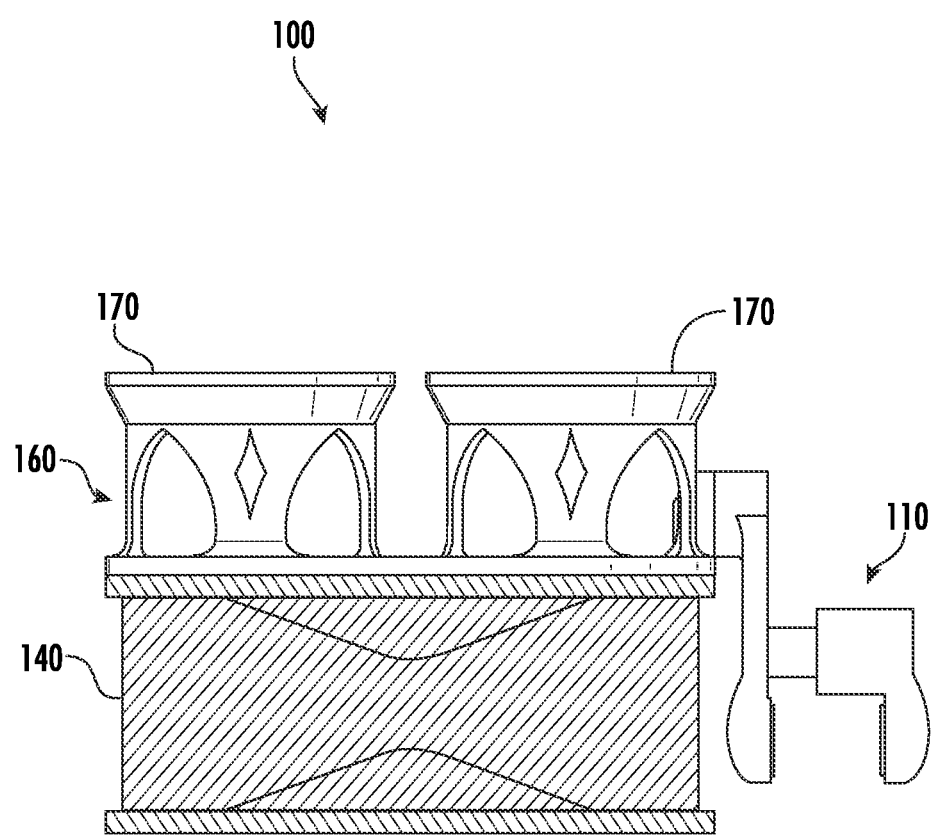
Figure 3:
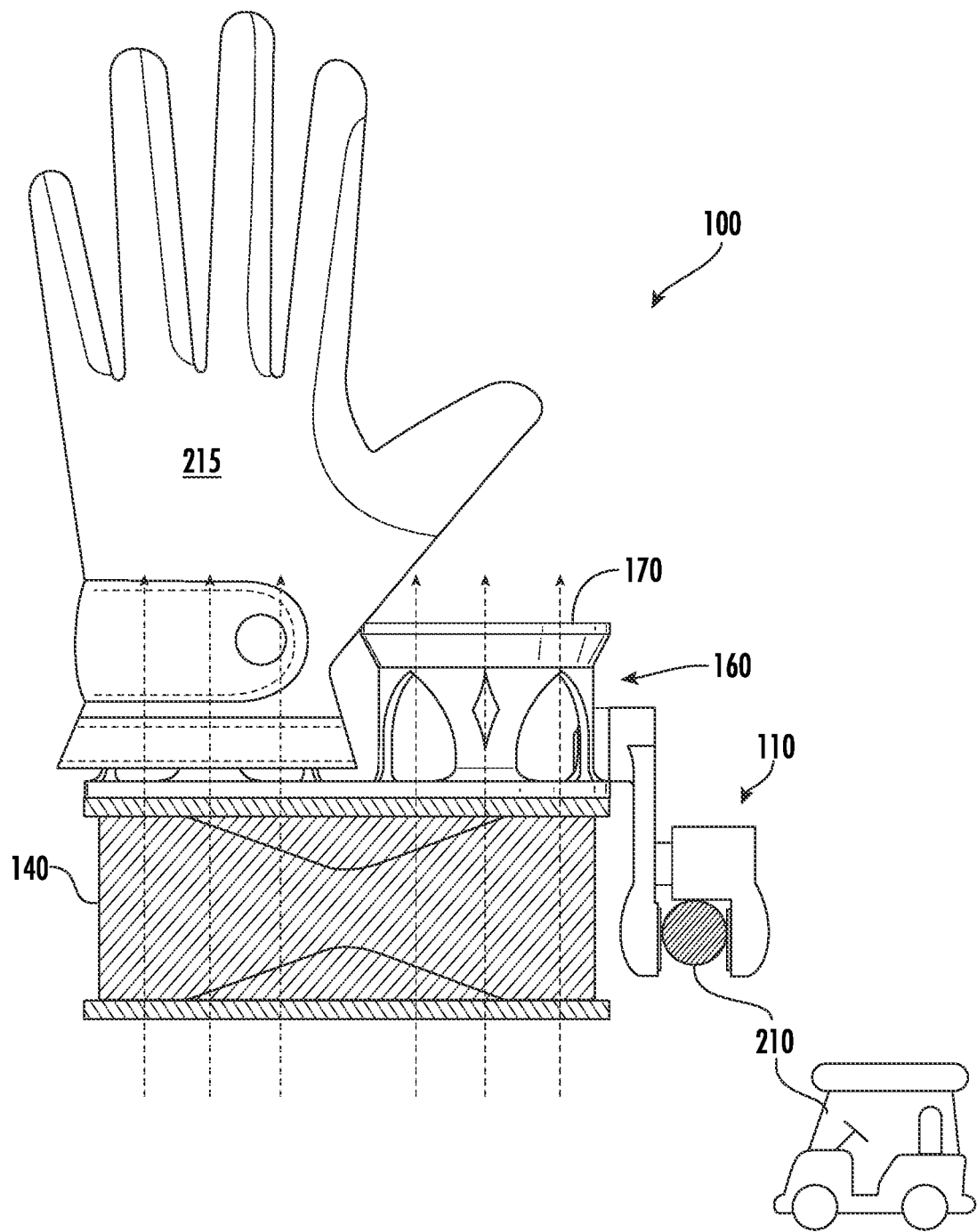
Figure 4:
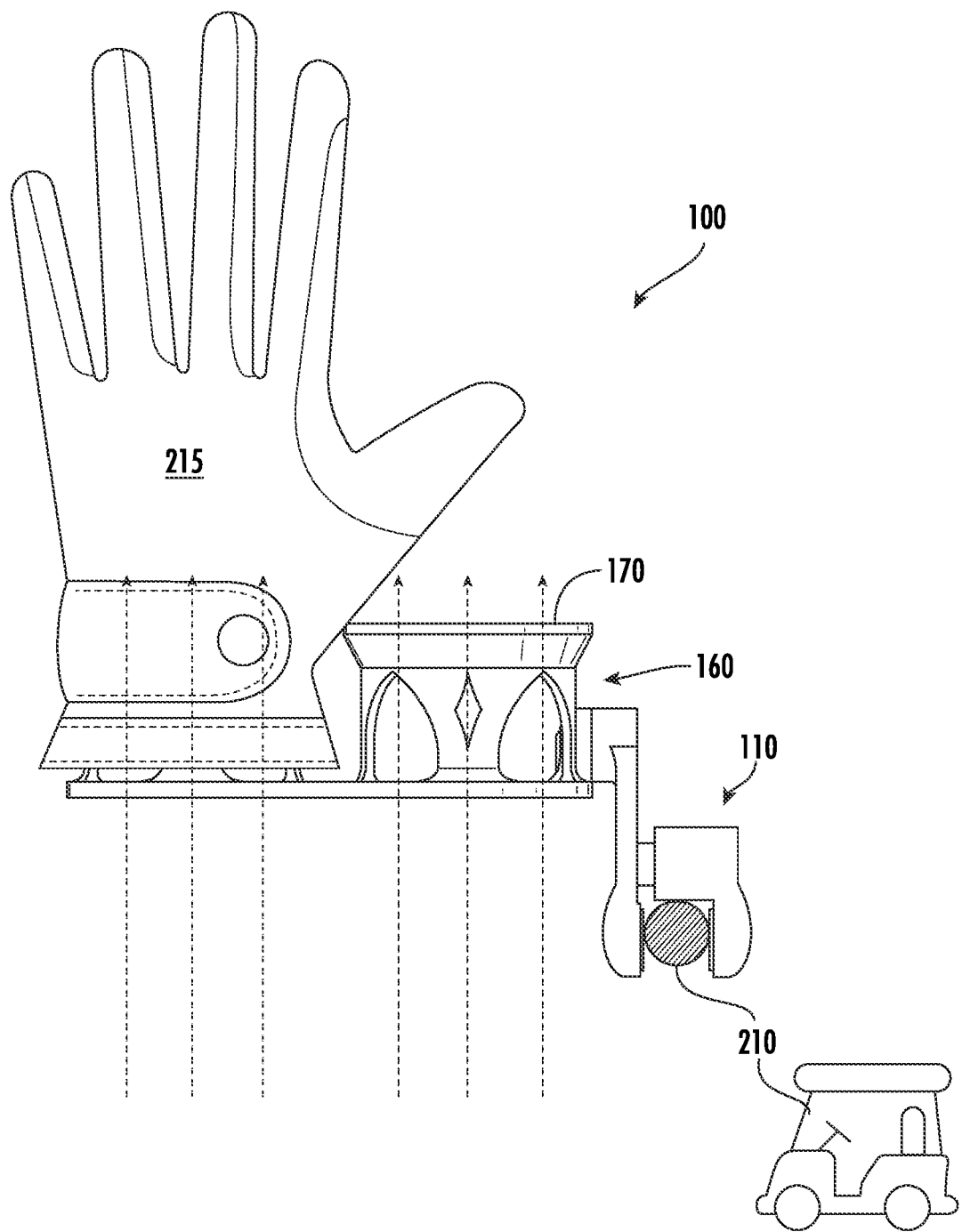
Figure 5:
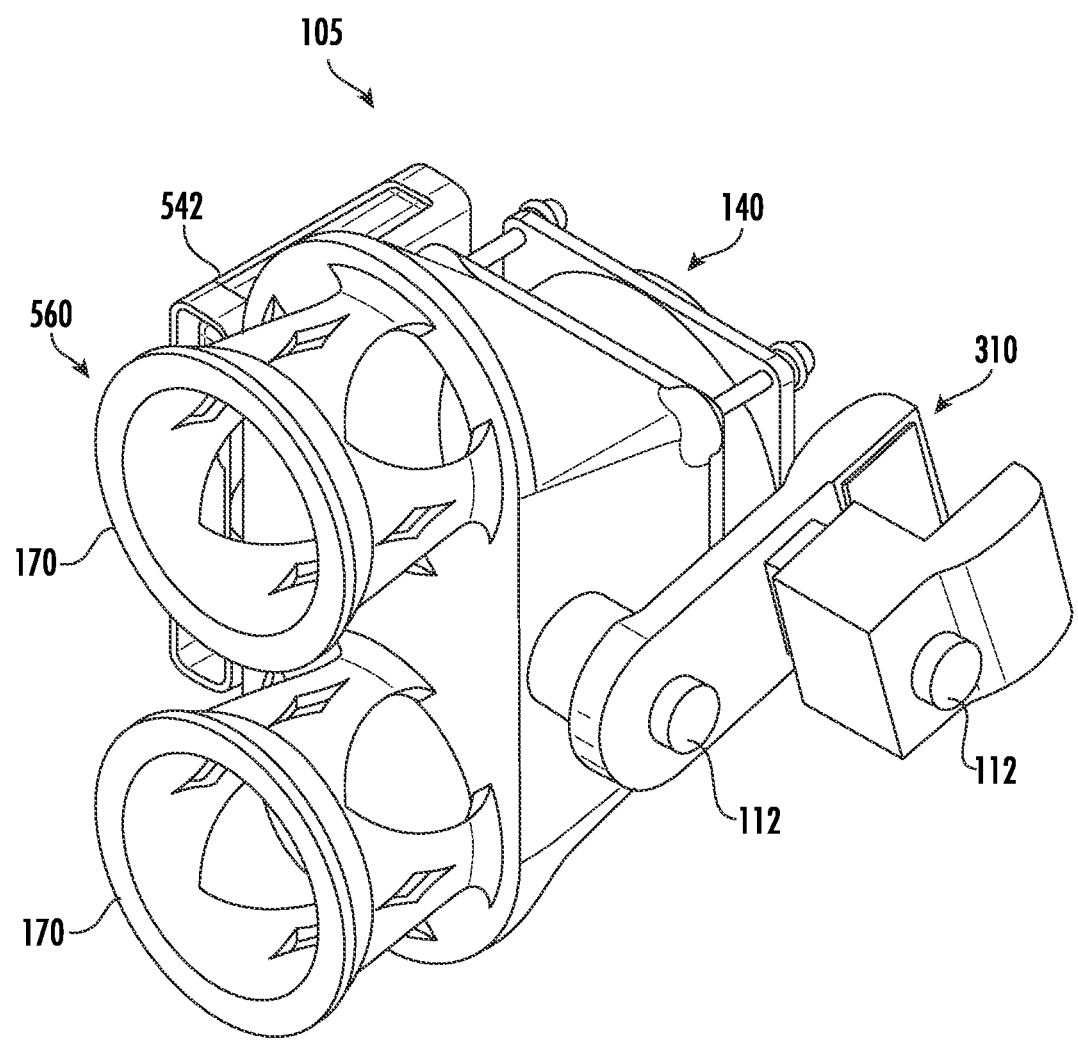
Figure 6:
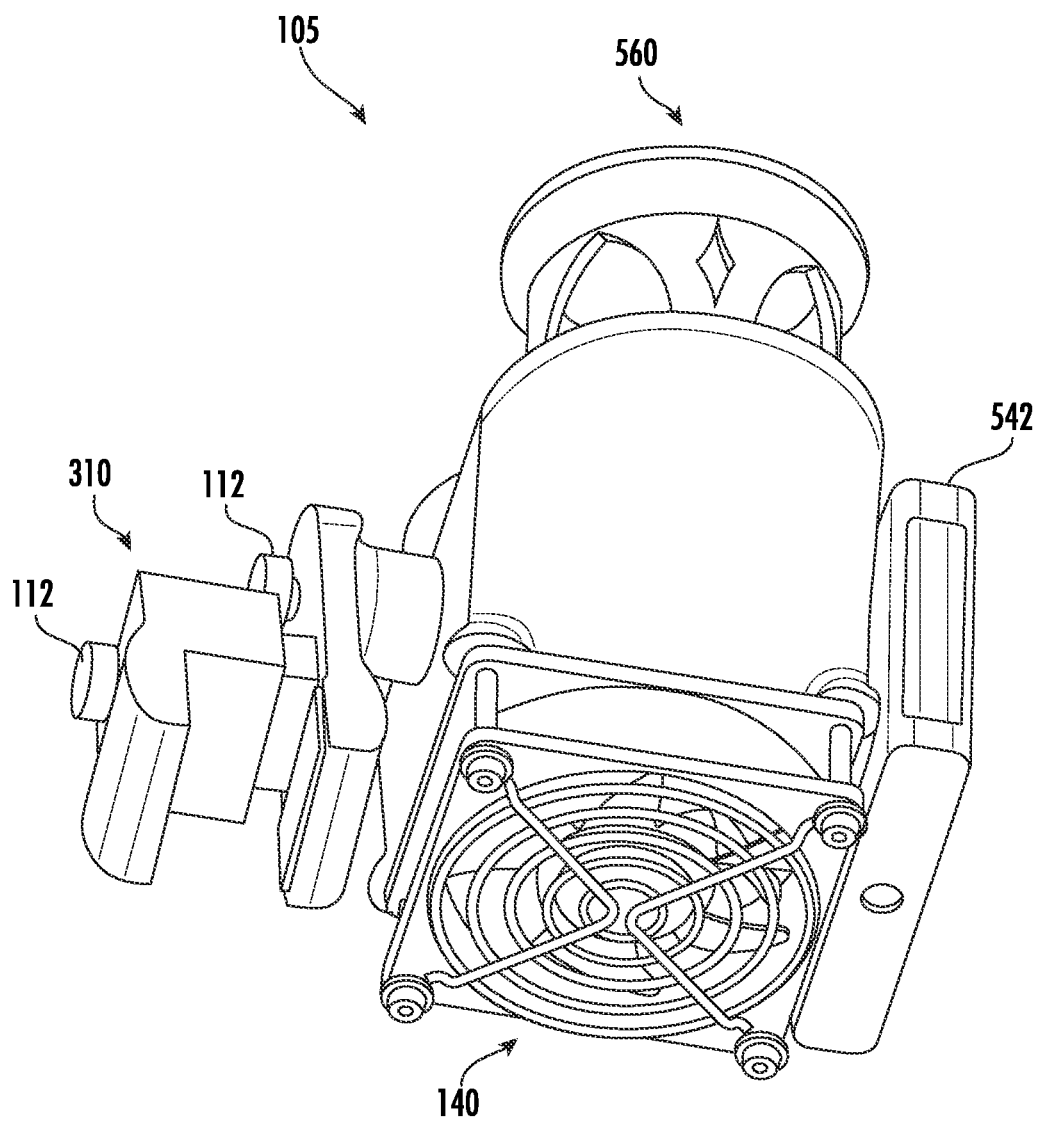
Figure 7:
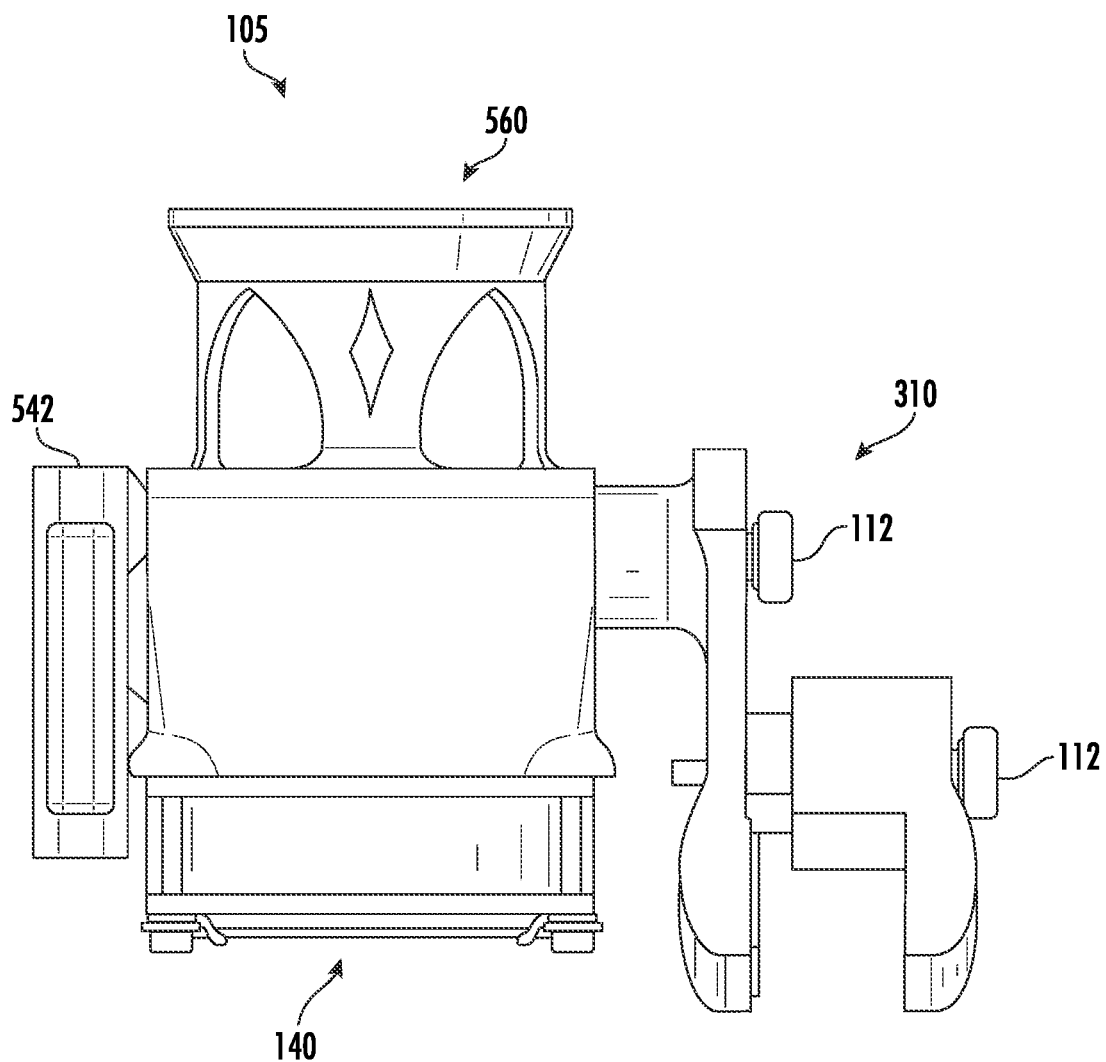
Figure 8:
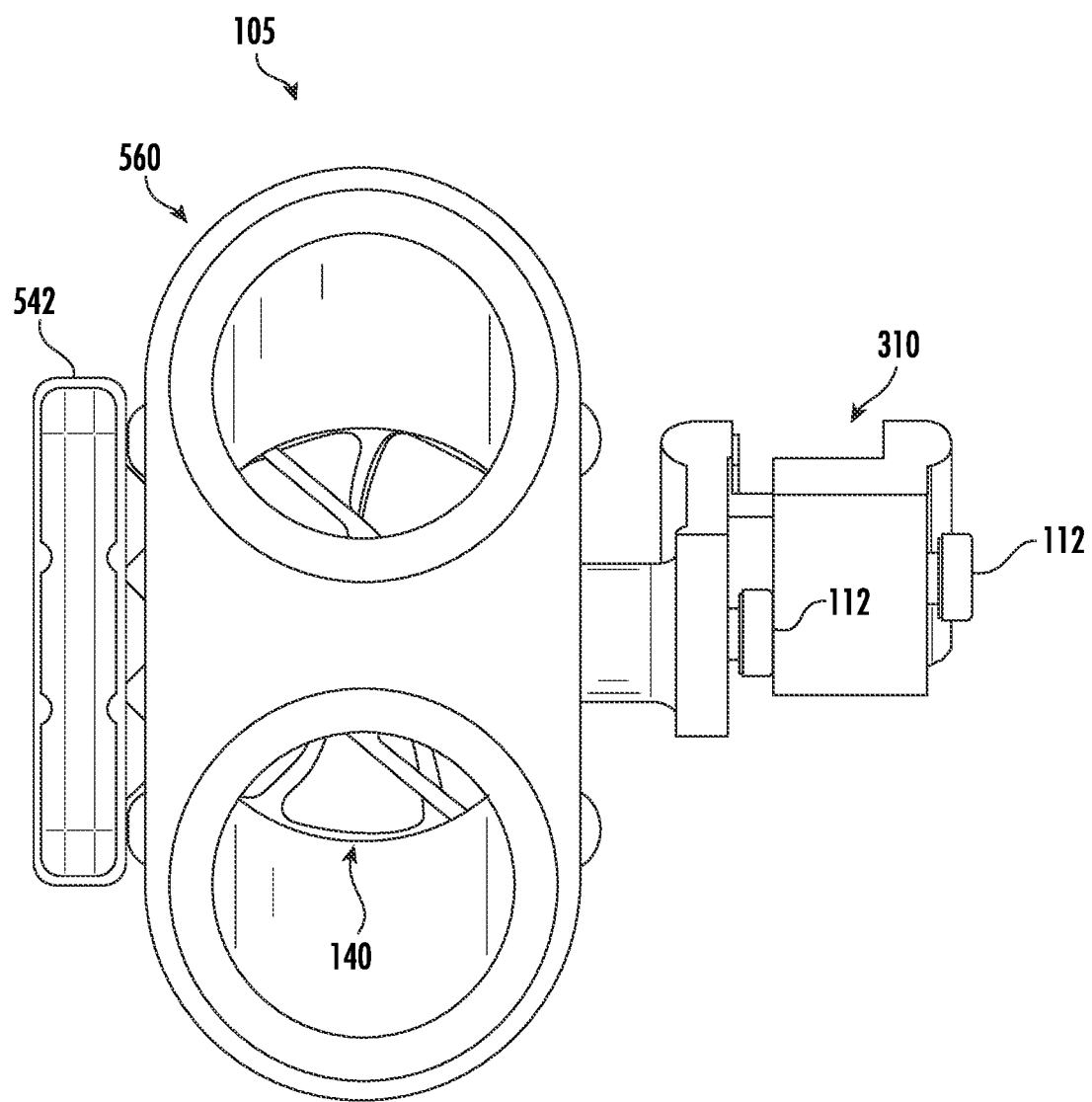
Figure 9:
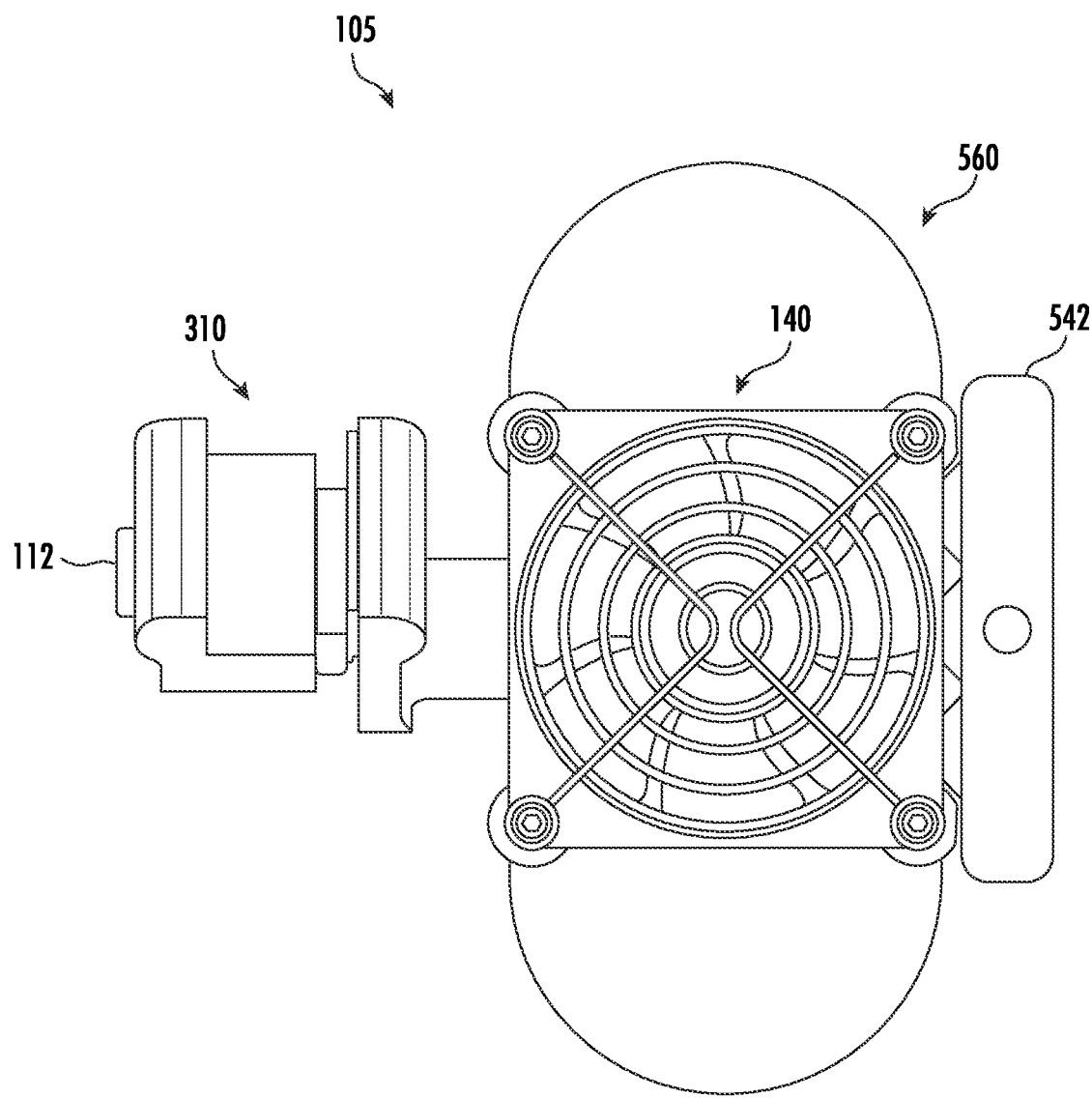
Figure 10:
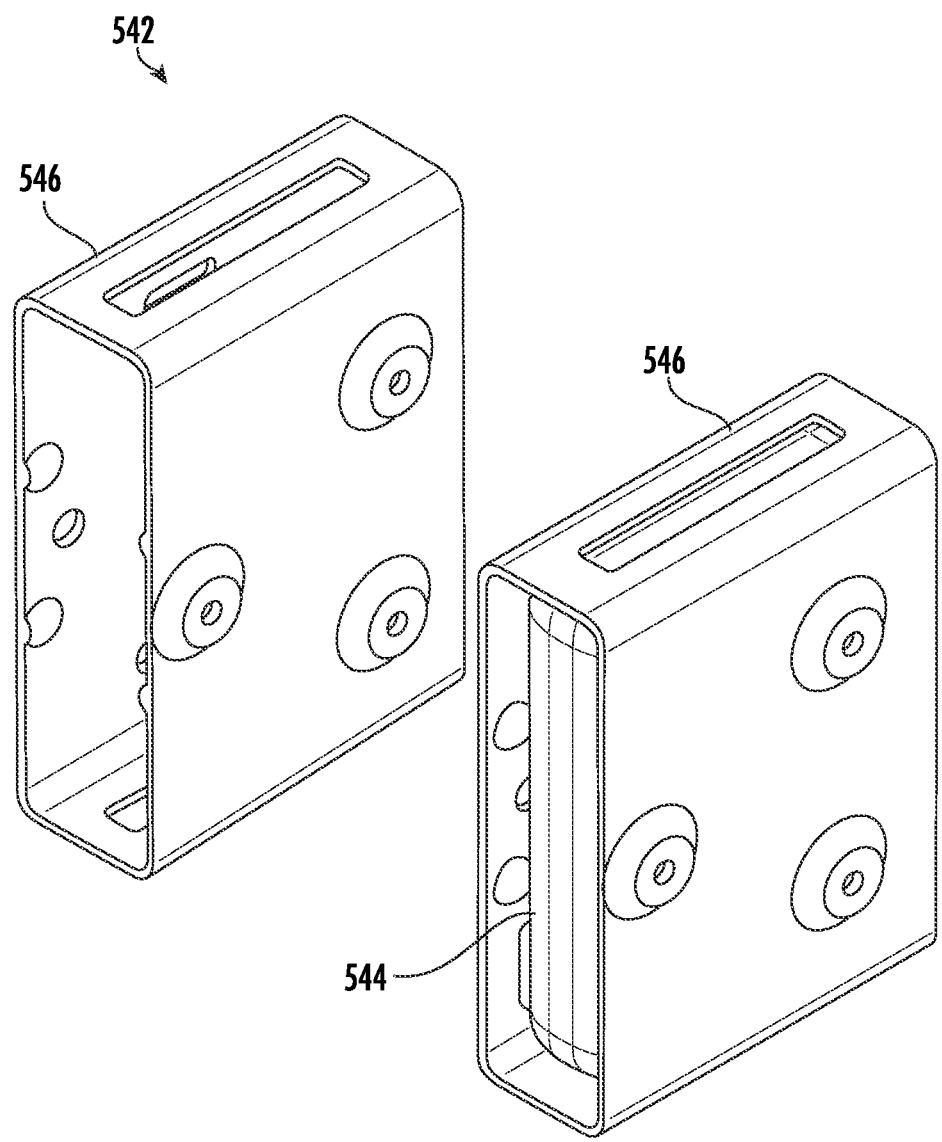
Figure 31:
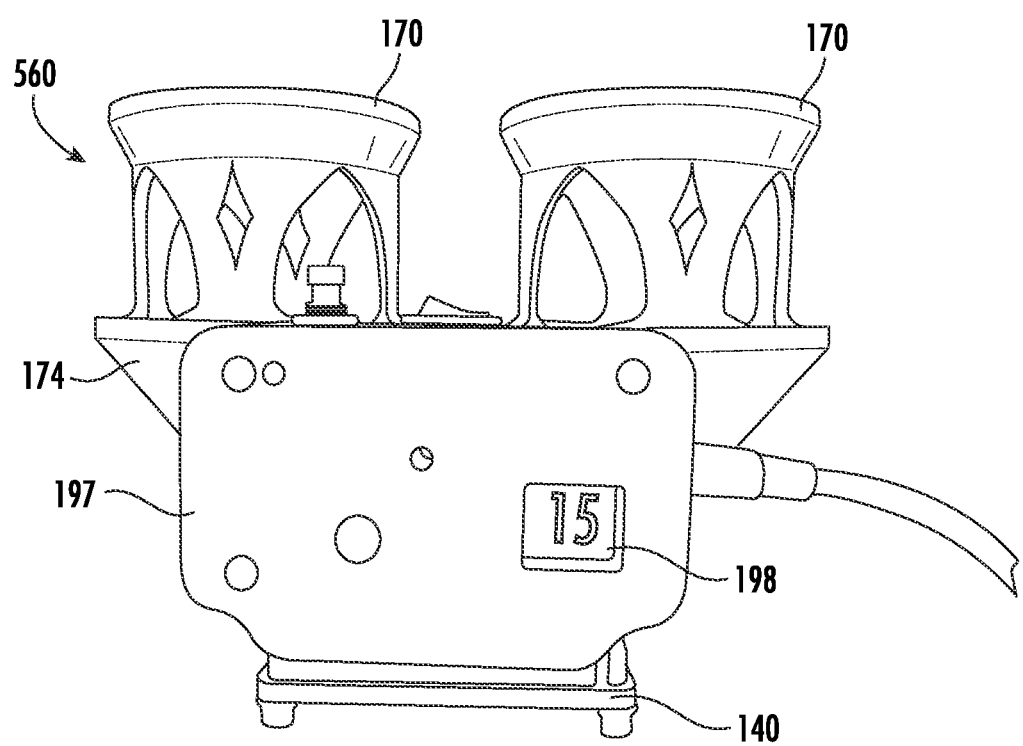
Figure 32:
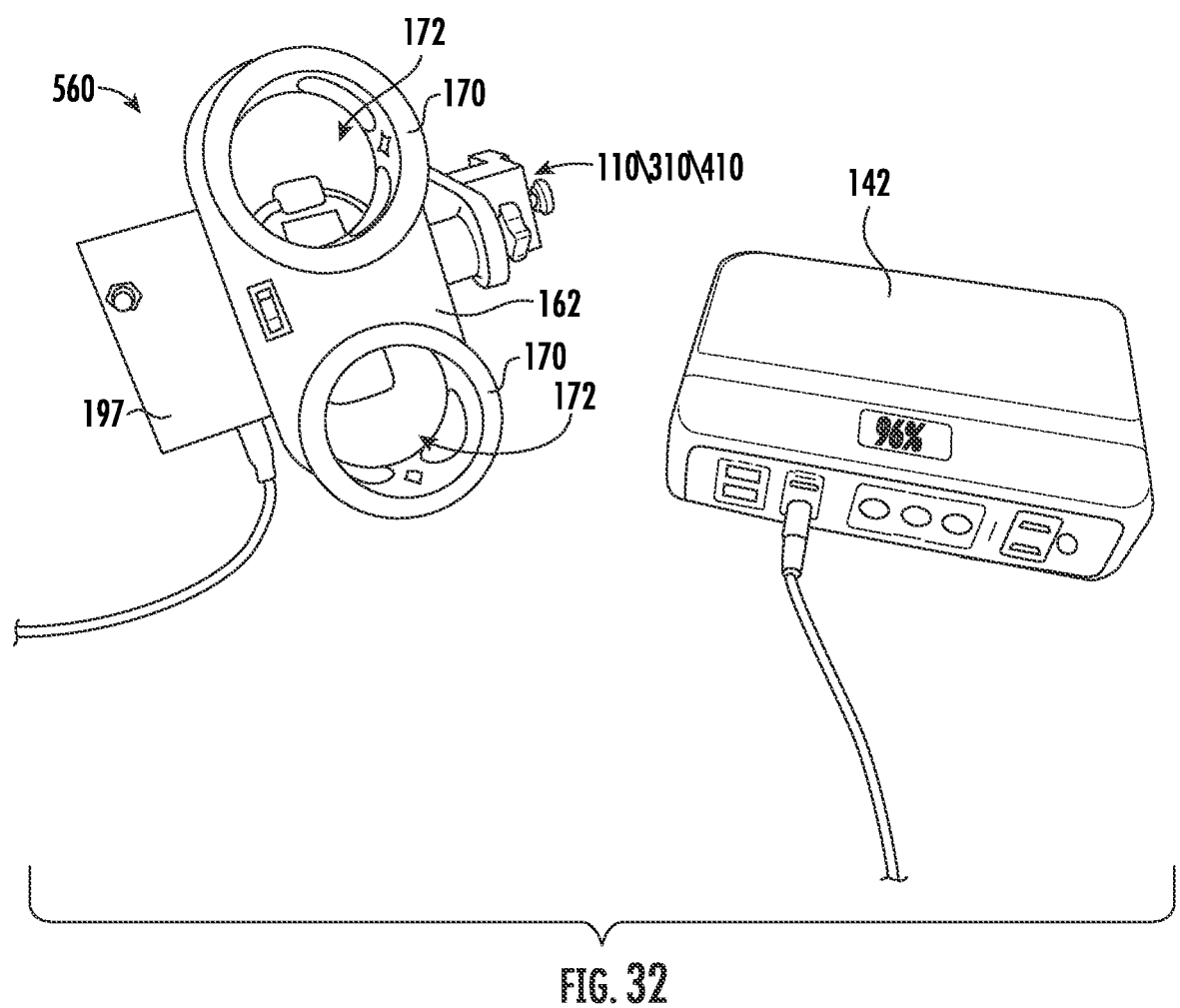
Figure 33:
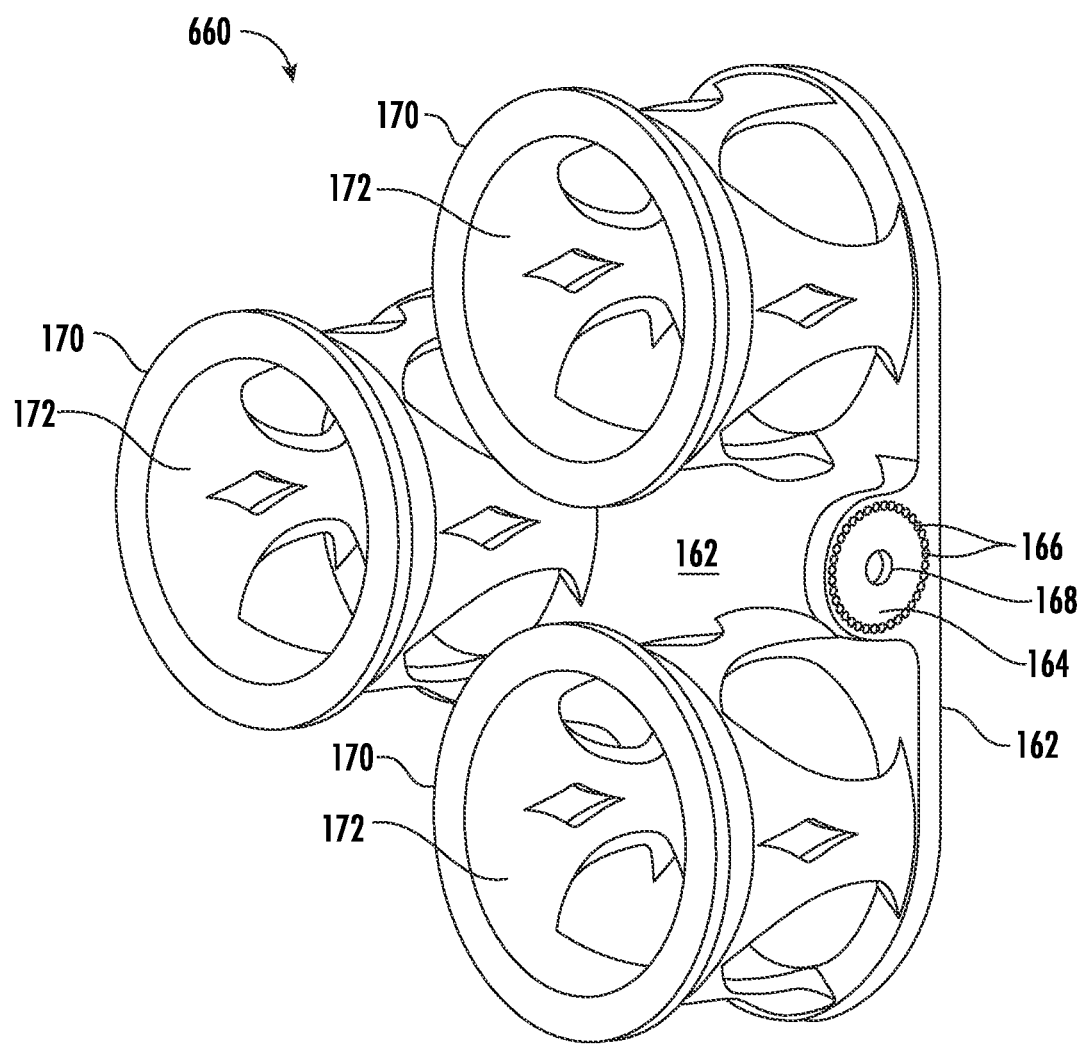
Figure 34:
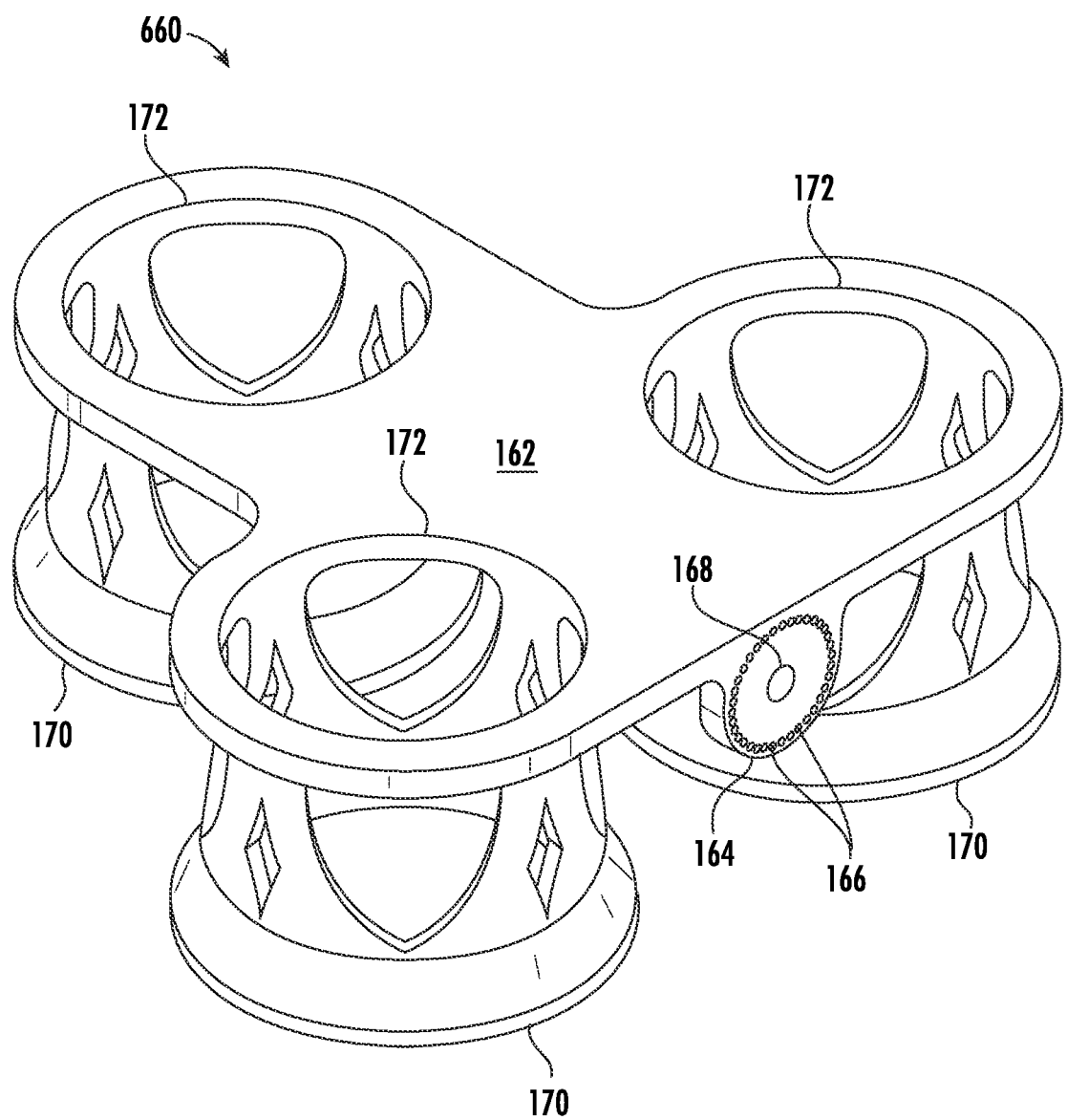
Figure 35:
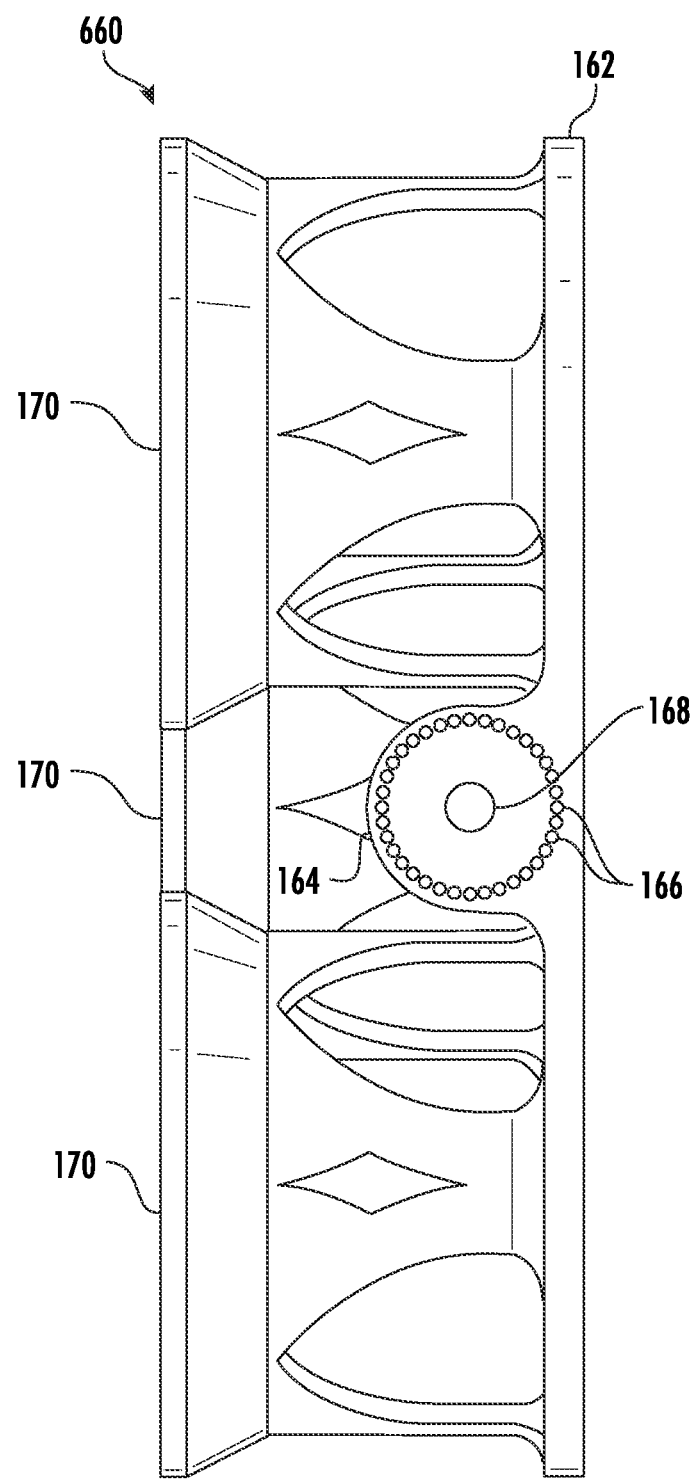
Figure 36:
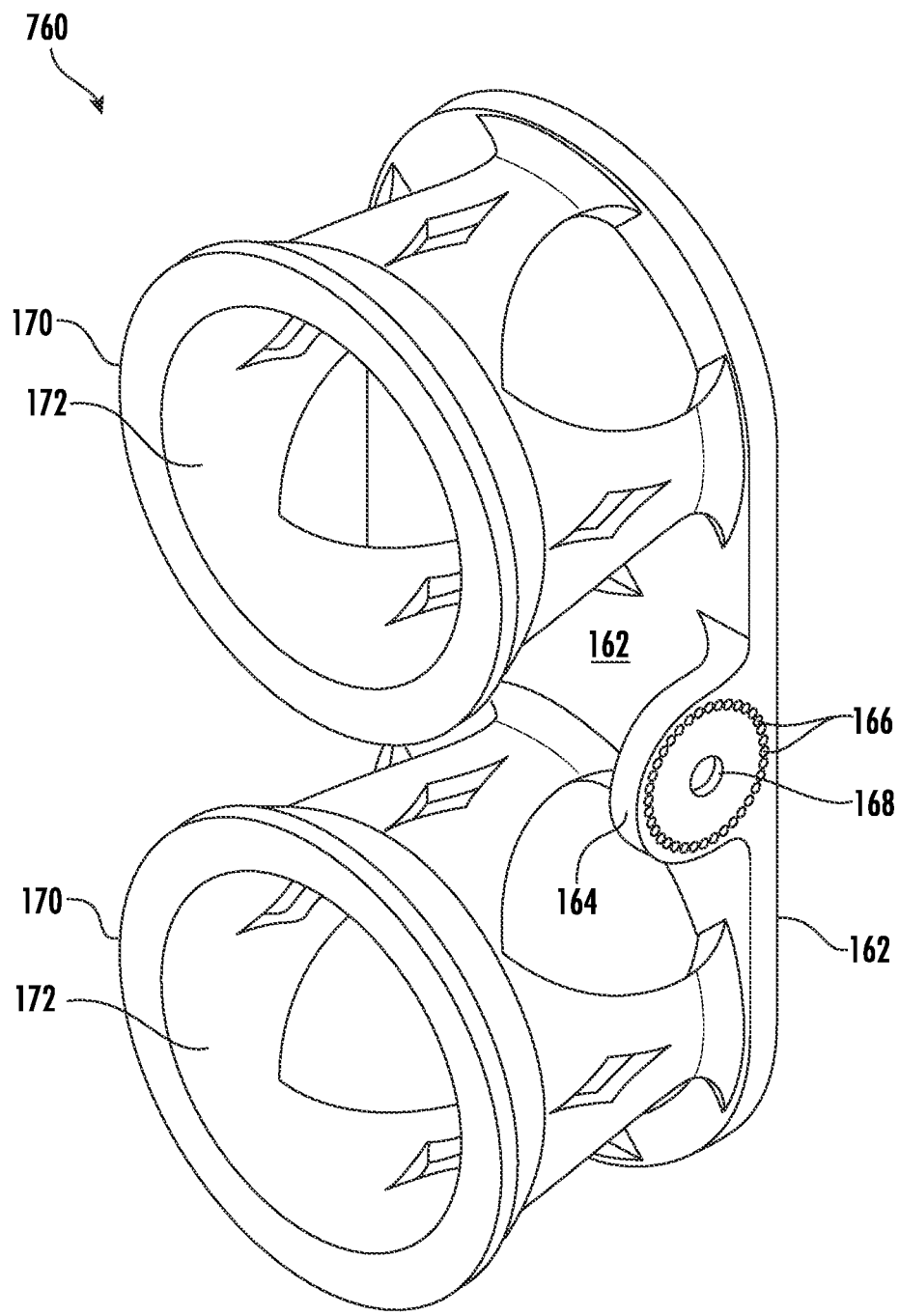
Figure 37:
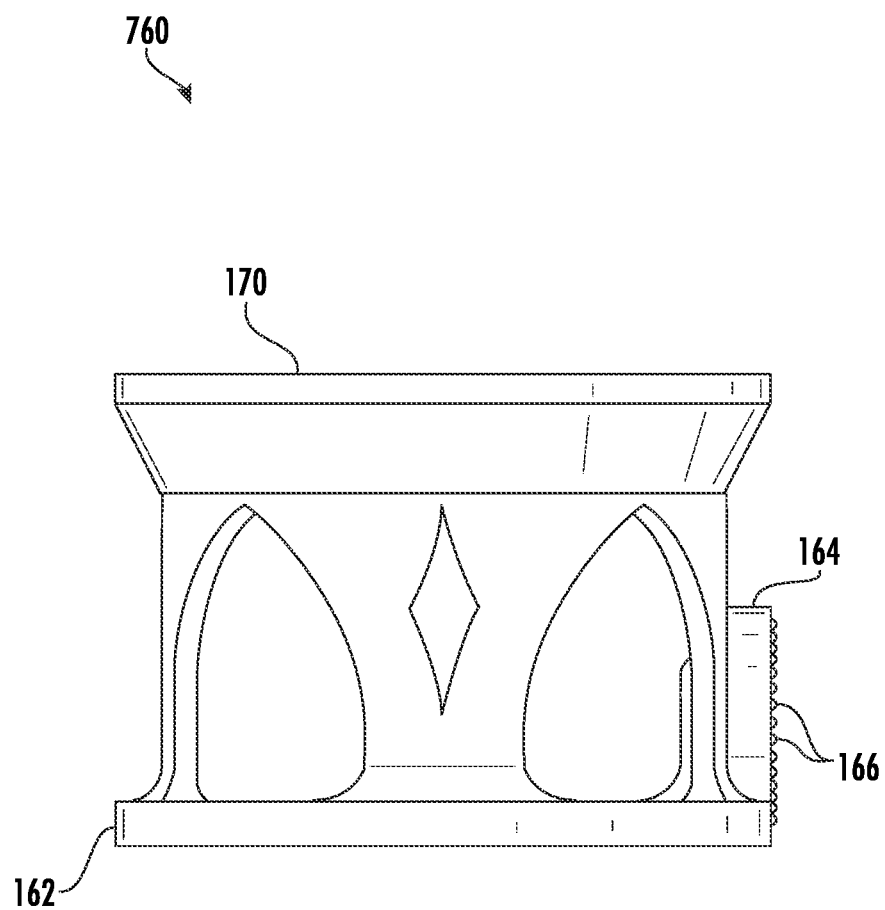
Figure 38:
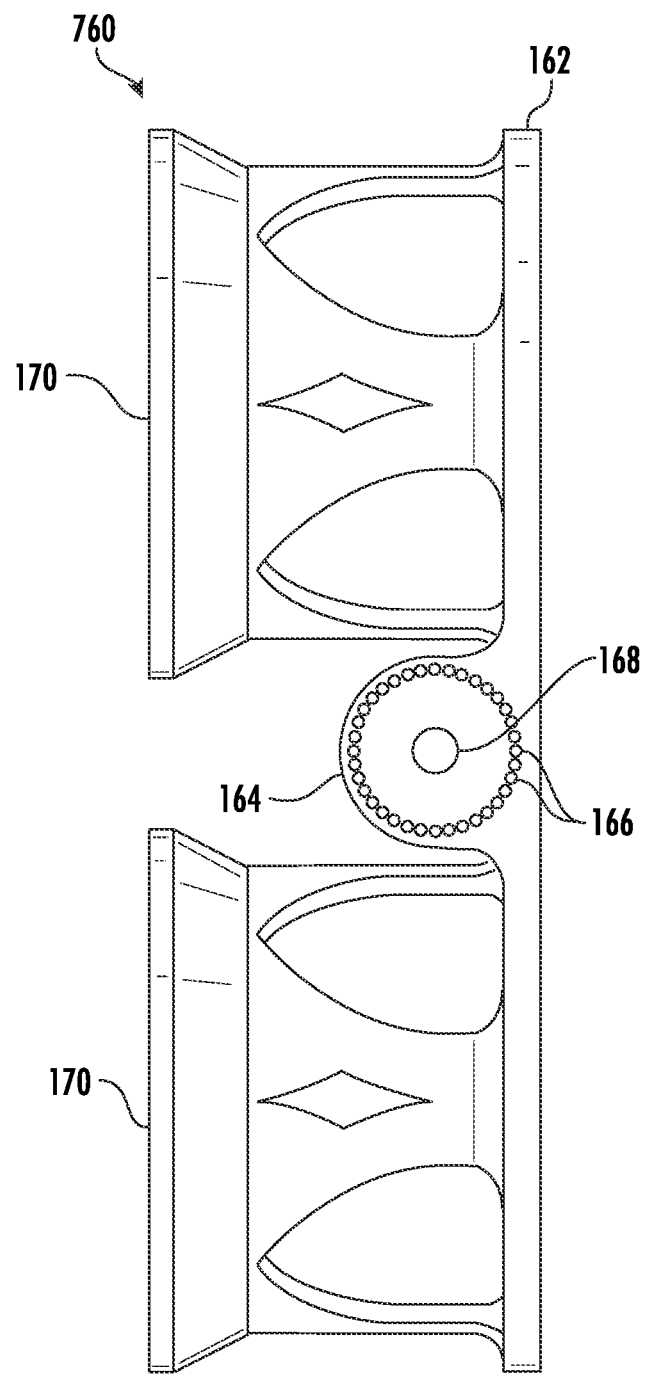
Figure 39:
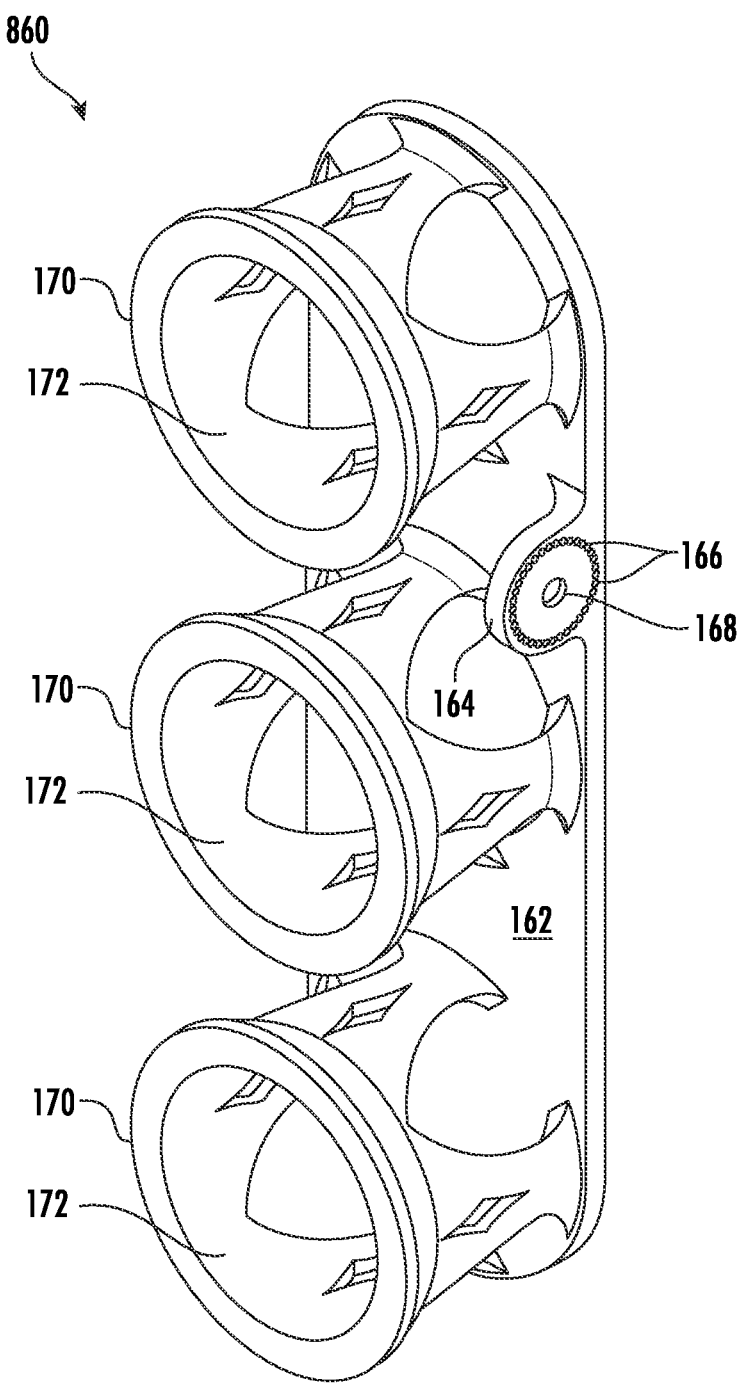
Figure 40:
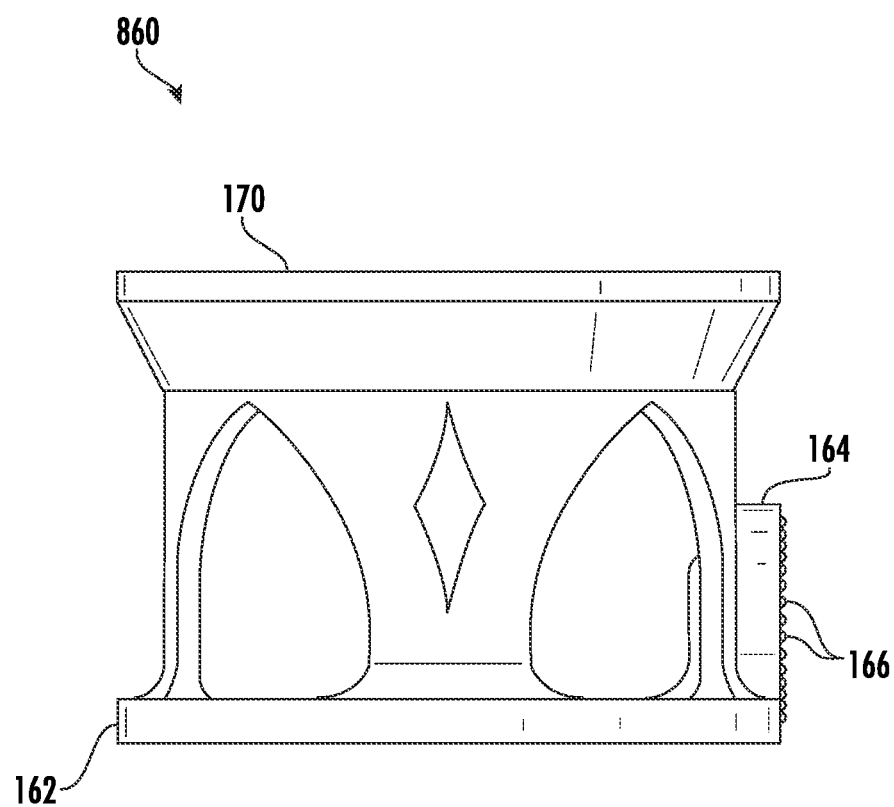
Figure 41:
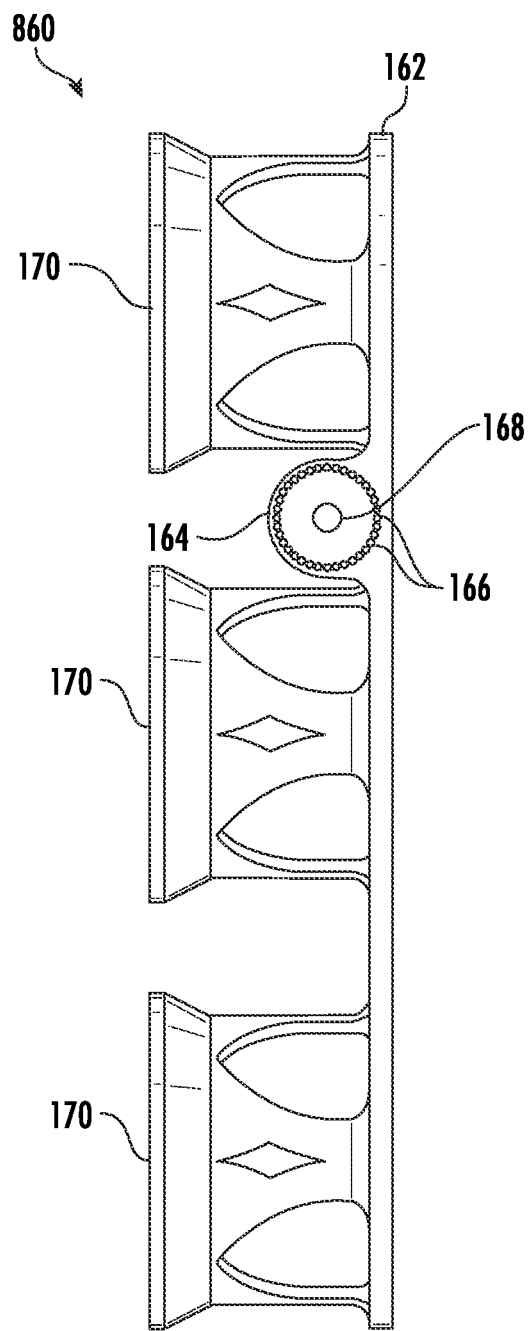
Figure 42:
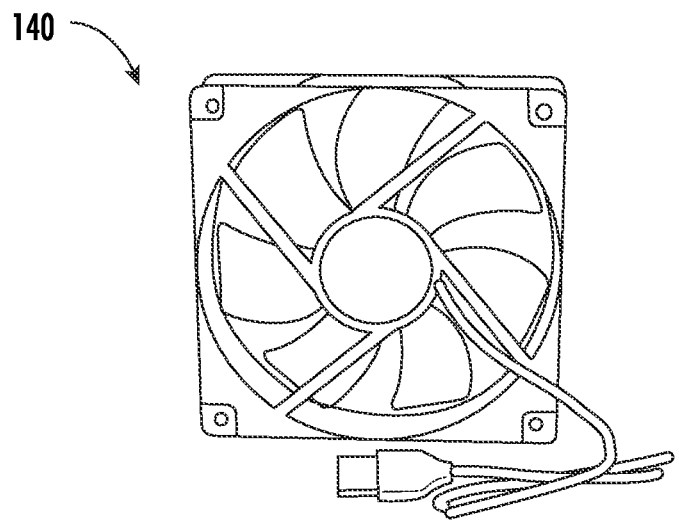
Figure 42:
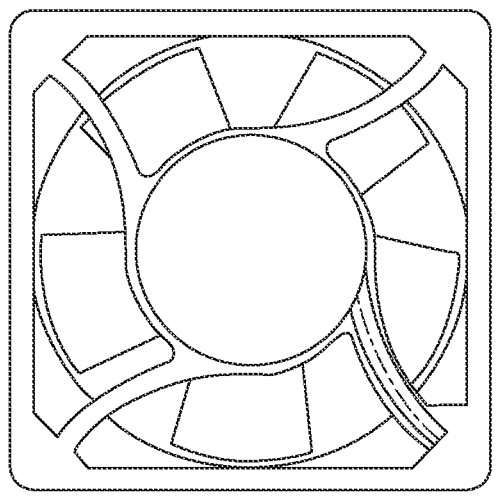
Figure 42:
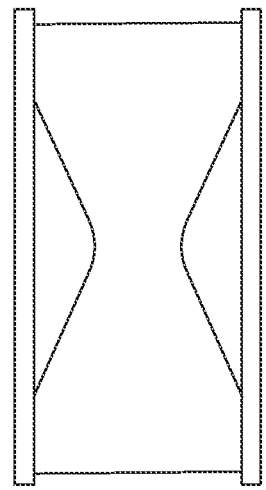
Figure 43:
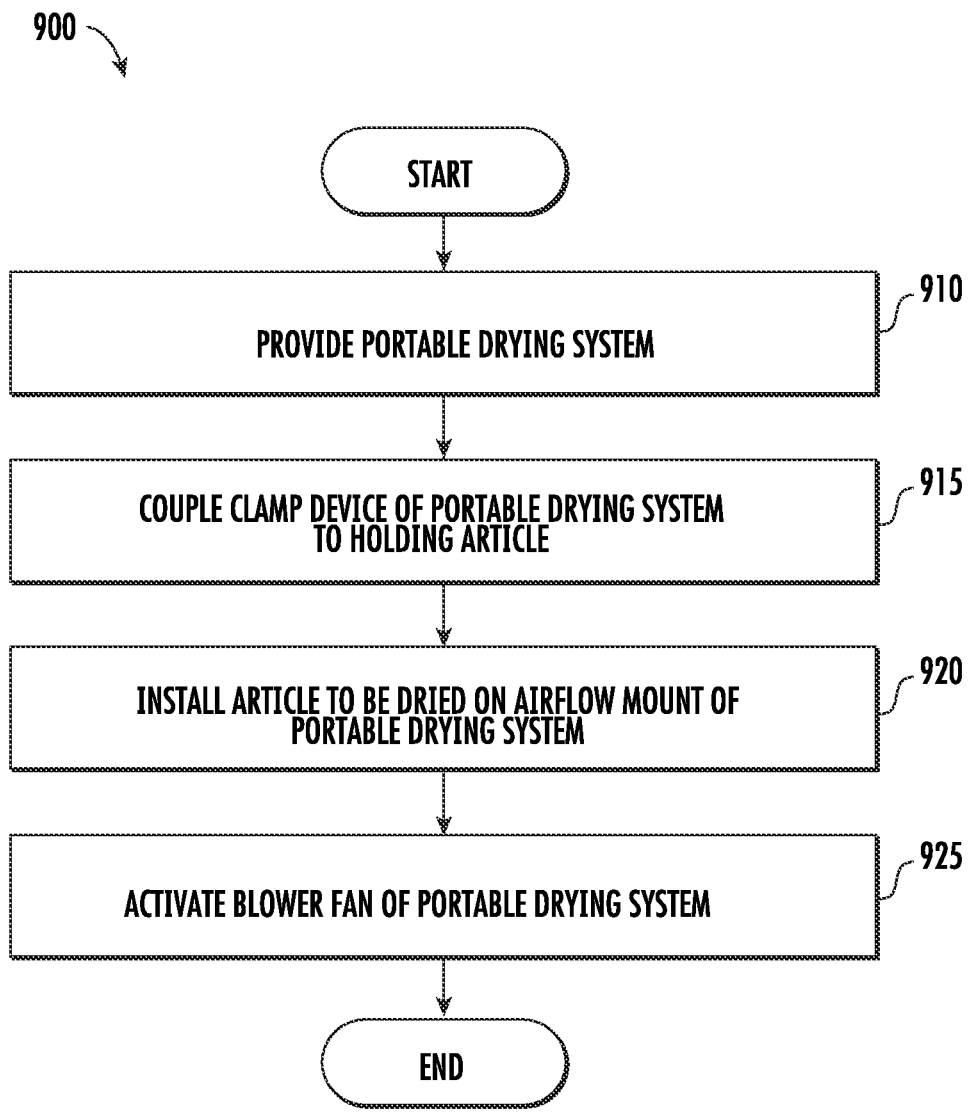
Figure 44A:
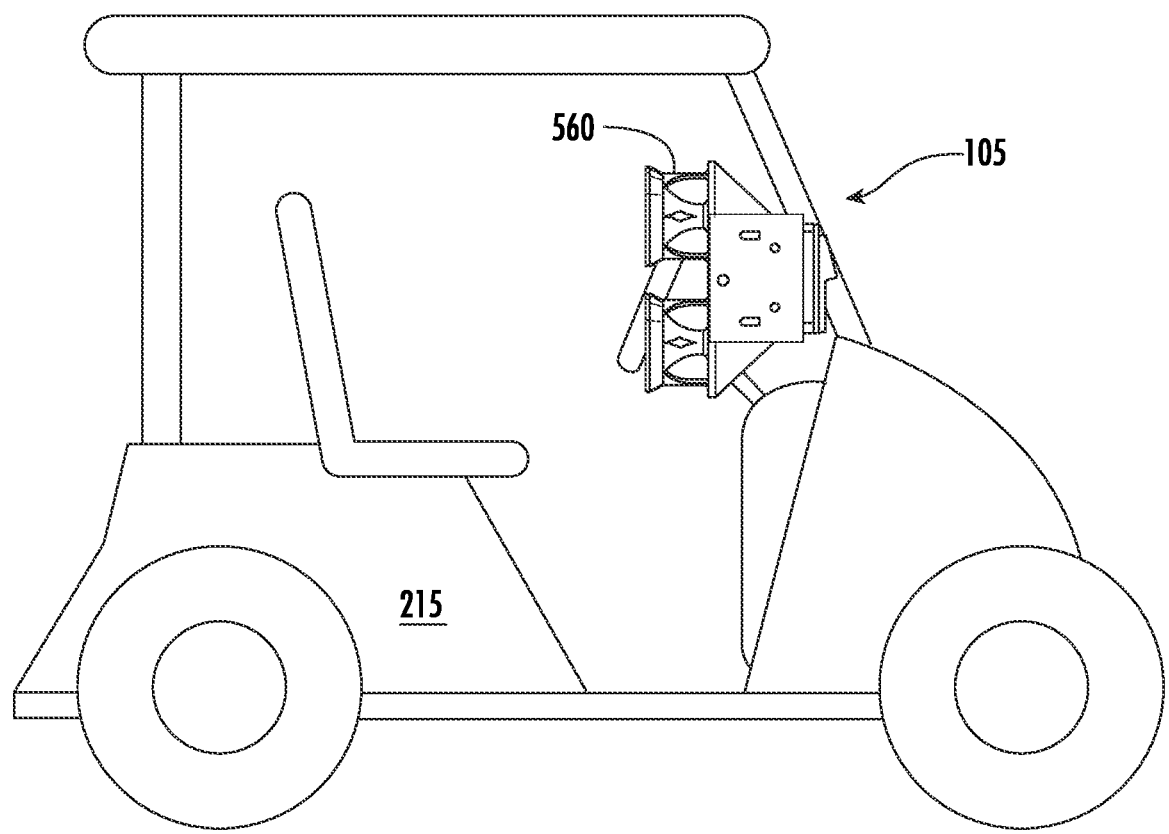
Figure 44B:
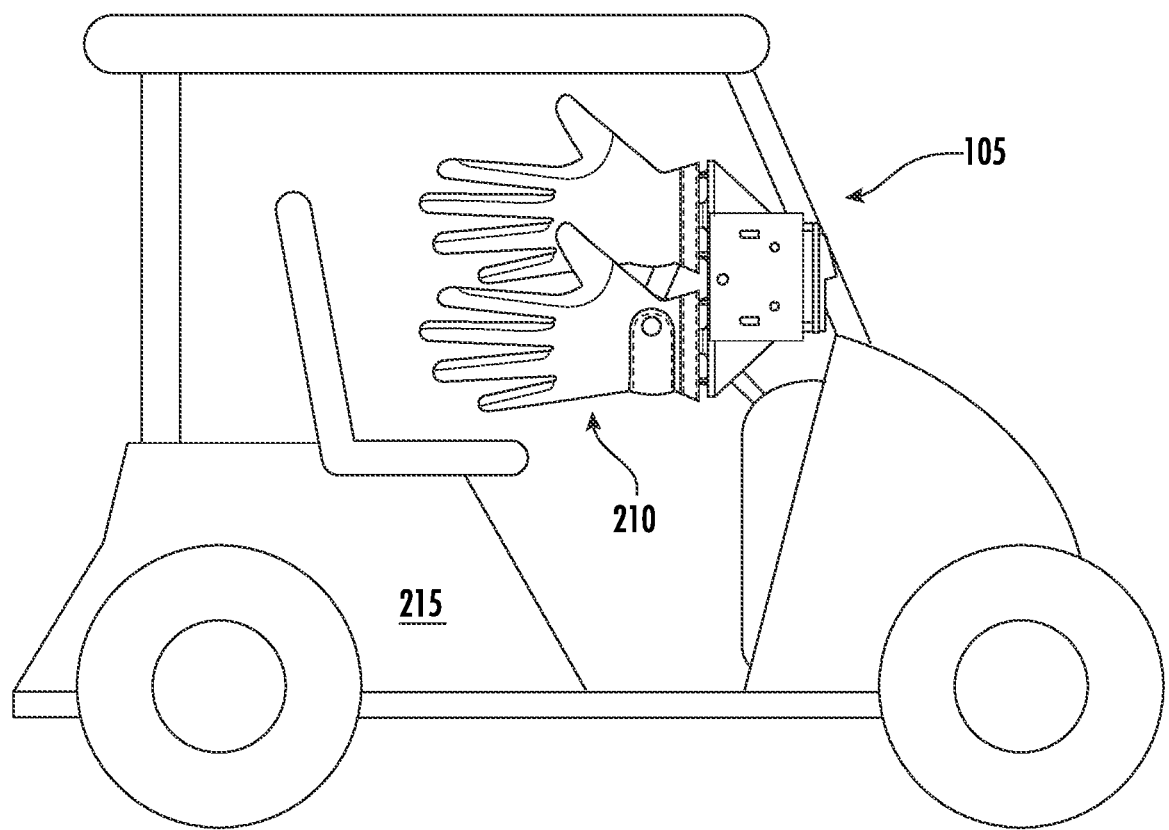
Figure 45:
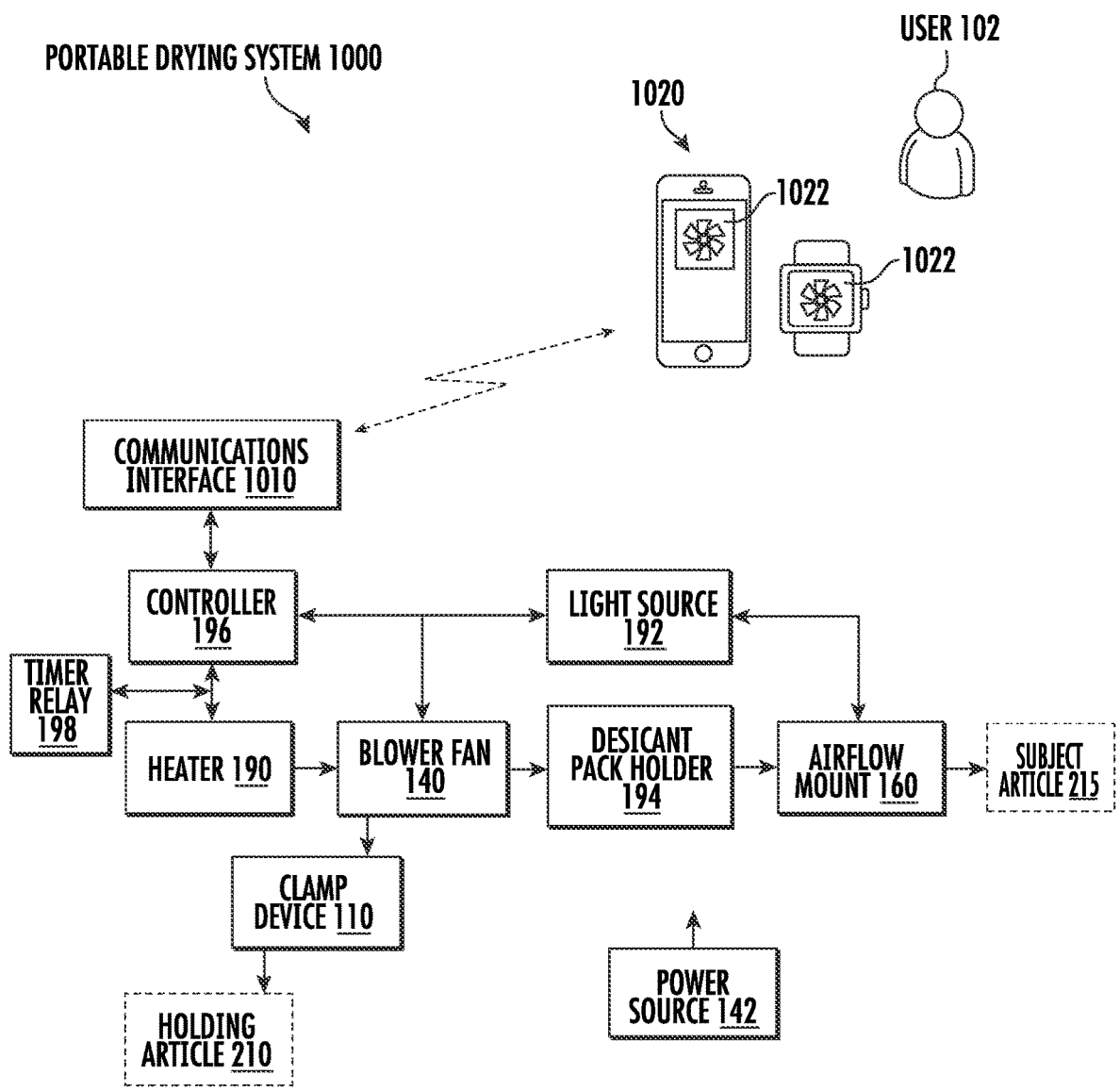

Having thus described the subject matter of the invention in general terms, reference will now be made to the accompanying drawings, which are not necessarily drawn to scale, and wherein:

FIG. 1 illustrates a block diagram of an example of a portable drying system for conveniently drying an article of clothing, in accordance with an embodiment of the invention;

FIG. 2 and FIG. 3 illustrate side views of an example instantiation of the portable drying system shown in FIG. 1, in accordance with an embodiment of the invention;

FIG. 4 illustrates a side view of another configuration of the portable drying system shown in FIG. 1, in accordance with an embodiment of the invention;

FIG. 5 through FIG. 9 illustrate various views of another example instantiation of the portable drying system shown in FIG. 1, in accordance with an embodiment of the invention;

FIG. 10 illustrates perspective views of an example of a power source of the portable drying system shown in FIG. 1, in accordance with an embodiment of the invention;

FIG. 11 through FIG. 18 illustrate various views of an example of a clamp device of the portable drying system shown in FIG. 1, in accordance with an embodiment of the invention;

FIG. 19 through FIG. 26 illustrate various views of another example of a clamp device of the portable drying system shown in FIG. 1, in accordance with an embodiment of the invention;

FIG. 27 through FIG. 30 illustrate various views of an example of an airflow mount of the portable drying system shown in FIG. 5 through FIG. 9, in accordance with an embodiment of the invention;

FIG. 31 and FIG. 32 illustrate various views of an example portable drying system, in accordance with an embodiment of the invention;

FIG. 33, FIG. 34, and FIG. 35 illustrate various views of another example of an airflow mount of the portable drying system shown in FIG. 1, in accordance with an embodiment of the invention;

FIG. 36, FIG. 37, and FIG. 38 illustrate various views of another example of an airflow mount of the portable drying system shown in FIG. 1, in accordance with an embodiment of the invention;

FIG. 39, FIG. 40, and FIG. 41 illustrate various views of yet another example of an airflow mount of the portable drying system shown in FIG. 1, in accordance with an embodiment of the invention;

FIG. 42 illustrate various views of an example of a blower fan of the portable drying system shown in FIG. 1, in accordance with an embodiment of the invention;

FIG. 43 illustrates a flow diagram of an example of a method of using the portable drying system for conveniently drying an article of clothing, in accordance with an embodiment of the invention;

FIG. 44A and FIG. 44B illustrate an example of the portable drying system shown in FIG. 5 through FIG. 9 when in use and affixed to a golf cart, in accordance with an embodiment of the invention; and FIG. 45 illustrates a block diagram of an example of a portable drying system in a networked system configuration and including wireless communication capability, in accordance with an embodiment of the invention.

DETAILED DESCRIPTION

The subject matter of the invention now will be described more fully hereinafter with reference to the accompanying drawings, in which some, but not all embodiments of the subject matter of the invention are shown. Like numbers refer to like elements throughout. The subject matter of the invention may be embodied in many different forms and should not be construed as limited to the embodiments set forth herein; rather, these embodiments are provided so that this disclosure will satisfy applicable legal requirements. Indeed, many modifications and other embodiments of the subject matter of the invention set forth herein will come to mind to one skilled in the art to which the subject matter of the invention pertains having the benefit of the teachings presented in the foregoing descriptions and the associated drawings. Therefore, it is to be understood that the subject matter of the invention is not to be limited to the specific embodiments disclosed and that modifications and other embodiments are intended to be included within the scope of the appended claims.

In some embodiments, the subject matter of the invention provides a portable drying system and method of using same.

In some embodiments, the portable drying system and method may provide a clamp device for coupling to any holding article, a blower fan, a power source, and an airflow mount for holding any article to be dried.

In some embodiments, the portable drying system and method may provide a clamp device for coupling to any portion of a golf cart, a blower fan (e.g., a DC muffin fan, a power source (e.g., a battery pack), and an airflow mount for holding one or more golf gloves to be dried, and optionally a heater, and optionally a light source, and/or and optionally a desiccant pack holder.

In some embodiments, the portable drying system and method may provide an airflow mount that may include one or more substantially circular holder frames, such as, but not limited to, three holder frames arranged in a triangular configuration, three holder frames arranged in a line, two holder frames arranged side-by-side, one holder frame, and so on.

In some embodiments, the portable drying system and method may provide the clamp device for coupling to any holding article and the airflow mount for holding any article to be dried, absent the blower fan and the power source.

In some embodiments, the portable drying system and method may provide a networked system by which a user may communicate wirelessly with the portable drying system via a drying system mobile app.

In some embodiments, the portable drying system and method may provide a networked system that may include a clamp device, a blower fan, a power source, an airflow mount, a controller, a heater, a light source, a desiccant pack holder, and a communications interface for communicating wirelessly with, for example, a drying system mobile app installed on a smart device, such as a mobile phone, and wherein a user may control the blower fan, the power source, the heater, and/or the light source using the drying system mobile app.

Further, a method of using the portable drying system is provided.

Referring now to FIG. 1 is a block diagram of an example of a portable drying system 100 for conveniently drying an article of clothing, in accordance with an embodiment of the invention. In one example, portable drying system 100 may be used for conveniently holding and drying a golf glove. In this example, portable drying system 100 may include a clamp device 110, a blower fan 140, a power source 142, an airflow mount 160, and optionally a heater 190, and optionally a light source 192, and optionally a desiccant pack holder 194. Further, a controller 196 may be provided to control the operations of blower fan 140, power source 142, heater 190, and/or light source 192. Further, power source 142 may be provided to power any active components, such as blower fan 140, heater 190, light source 192, and controller 196.

Controller 196 may be any standard controller or microprocessor device that is capable of executing program instructions. Controller 196 may be used to manage the overall operations of portable drying system 100. Heater 190 may be, for example, a DC powered resistive type heater that may be arranged either upstream or downstream of blower fan 140. In one non-limiting example, heater 190 may be a 50 watt heater. In another non-limiting example, heater 190 may be a 70 watt heater. However, heater 190 may be of any suitable wattage. Heater 190 may be a built in/integrated component or an add on component. Light source 192 may be any light source for providing/improving drying capabilities in place of or in addition to heater 190. In one example, light source 192 may be installed external to airflow mount 160 but directed toward, for example, subject article 215. In another example, one or more light sources 192 may be arranged inside airflow mount 160 and in the airflow path. Desiccant pack holder 194 may be holding one or more desiccant packs (not shown). Desiccant pack holder 194 may be arranged between blower fan 140 and airflow mount 160 to help mitigate high humidity in the ambient air and aid in drying.

In portable drying system 100, blower fan 140, heater 190, light source 192, and/or desiccant pack holder 194 may be optional. That is, portable drying system 100 may include any combinations of blower fan 140, heater 190, light source 192, and/or desiccant pack holder 194.

Clamp device 110 of portable drying system 100 may be any type of clamping mechanism that is operable by hand and that may be easily adjusted and secured to any other article capable of receiving and supporting clamp device 110. For example, clamp device 110 may be coupled to a holding article 210. Portable drying system 100 may be used to hold and dry a subject article 215. In one example, subject article 215 to be held and dried may be a golf glove. In this example, holding article 210 may be a golf cart. However, portable drying system 100 is not limited to use with a golf glove and golf cart only. Portable drying system 100 may be used to hold and dry any other types of articles and may be mounted on any other types of holding articles.

Blower fan 140 may be any blower fan that is suitably sized to dry, for example, one or more articles of clothing, such as one or more golf gloves. In one example, blower fan 140 may be a standard DC powered muffin fan, such as a 5-volt, 12-volt, or 24-volt DC muffin fan. The footprint of blower fan 140 may be, for example, about 3 to 4 inches square or about 3 to 4 inches round. An example of blower fan 140 is shown hereinbelow with reference to FIG. 42.

In one non-limiting example, power source 142 may be a 5-volt, 12-volt, or 24-volt DC power source, such as a 5-volt, 12-volt, or 24-volt battery. In another non-limiting example, power source 142 may be 12 v in the range of 6-30 amps. However, power source 142 may be of any suitable voltage and/or amps greater or less than the examples described herein. Power source 142 may include one or more rechargeable or non-rechargeable batteries, such as, for example, battery pack 542, (see FIG. 10). In one example, power source 142 (e.g., battery pack 542) may be provided as a built in/integrated component, along with clamp device 110, blower fan 140, and/or airflow mount 160. In another example, power source 142 (e.g., battery pack 542) may be an add-on component separate from clamp device 110, blower fan 140, and/or airflow mount 160. In another example, power source 142 may be a remote power source, such as, for example, the golf cart power supply.

Referring now to FIG. 2 and FIG. 3 are side views of an example instantiation of the portable drying system 100 shown in FIG. 1, in accordance with an embodiment of the invention. For example, FIG. 2 shows an example of blower fan 140 suppling a pair of substantially circular holder frames 170 of airflow mount 160. Further, in the example, clamp device 110 couples to one side of airflow mount 160. For example, when in use, and referring now to FIG. 3, a golf glove 215, which is one example of subject article 215, may be stretched onto one of the holder frames 170 and in the airflow path of blower fan 140. Further, FIG. 3 shows the clamping portion of clamp device 110 coupled to holding article 210, which may be, for example, any portion of a golf cart 210, e.g., windshield frame.

Referring now to FIG. 4 is a side view of another configuration of the portable drying system 100 shown in FIG. 1, in accordance with an embodiment of the invention. In this example configuration of portable drying system 100, blower fan 140 may be omitted and golf glove 215 may be air dried by the movement of the golf cart 210.

Referring now to FIG. 5 through FIG. 9 are various views of a portable drying system 105, which is another example instantiation of the portable drying system 100 shown in FIG. 1, in accordance with an embodiment of the invention. In this example, portable drying system 105 may include a clamp device 310, blower fan 140 that is powered via a battery pack 542 (see FIG. 10), and an airflow mount 560. Further, airflow mount 560 may be, for example, a two-port airflow mount.

In this example, clamp device 310 may be affixed to one side of airflow mount 560 and battery pack 542 may be affixed to the opposite side of airflow mount 560. Further, blower fan 140 may supply the air inlets of the two holder frames 170. Further, two fasteners 112 may be provided. One fastener 112 may be for coupling clamp device 310 to the side of airflow mount 560. Clamp device 310 may be rotated about this fastener 112 for setting the angle of clamp device 310 with respect to airflow mount 560. Then, another fastener 112 may be for tightening and/or loosing clamp device 310. More details of an example of clamp device 310 are shown and described hereinbelow with reference to FIG. 11 through FIG. 18. More details of an example of the two-port airflow mount 560 are shown and described hereinbelow with reference to FIG. 27 through FIG. 30.

Referring now to FIG. 10 is perspective views of an example of battery pack 542, which is just one example of power source 142 of portable drying system 100 shown in FIG. 1. In this example, battery pack 542 may include a battery 544 held within a battery housing 546. Battery housing 546 may be designed to fasten to airflow mount 560, as shown in FIG. 5 through FIG. 9.

Figure 11:
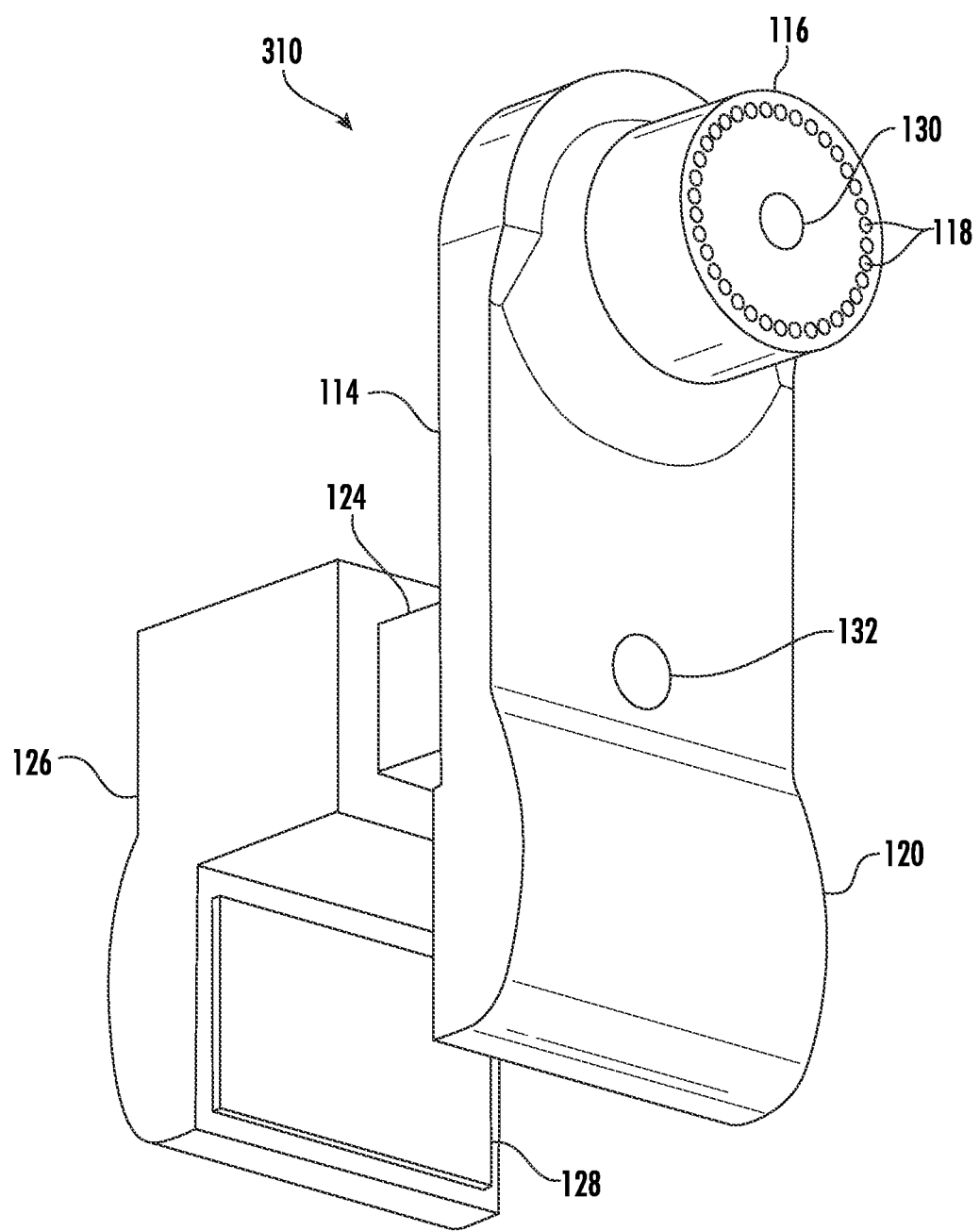
Figure 12:
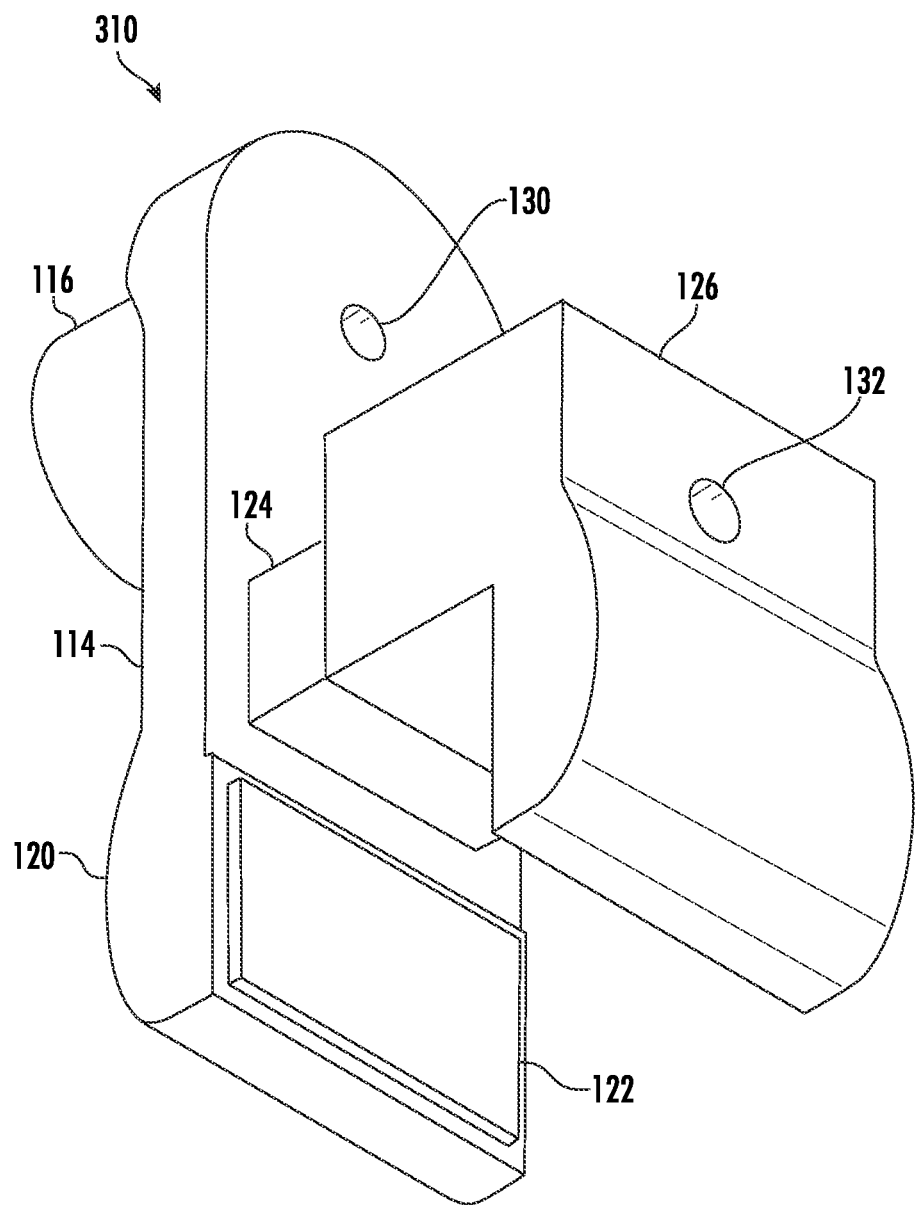
Figure 13:
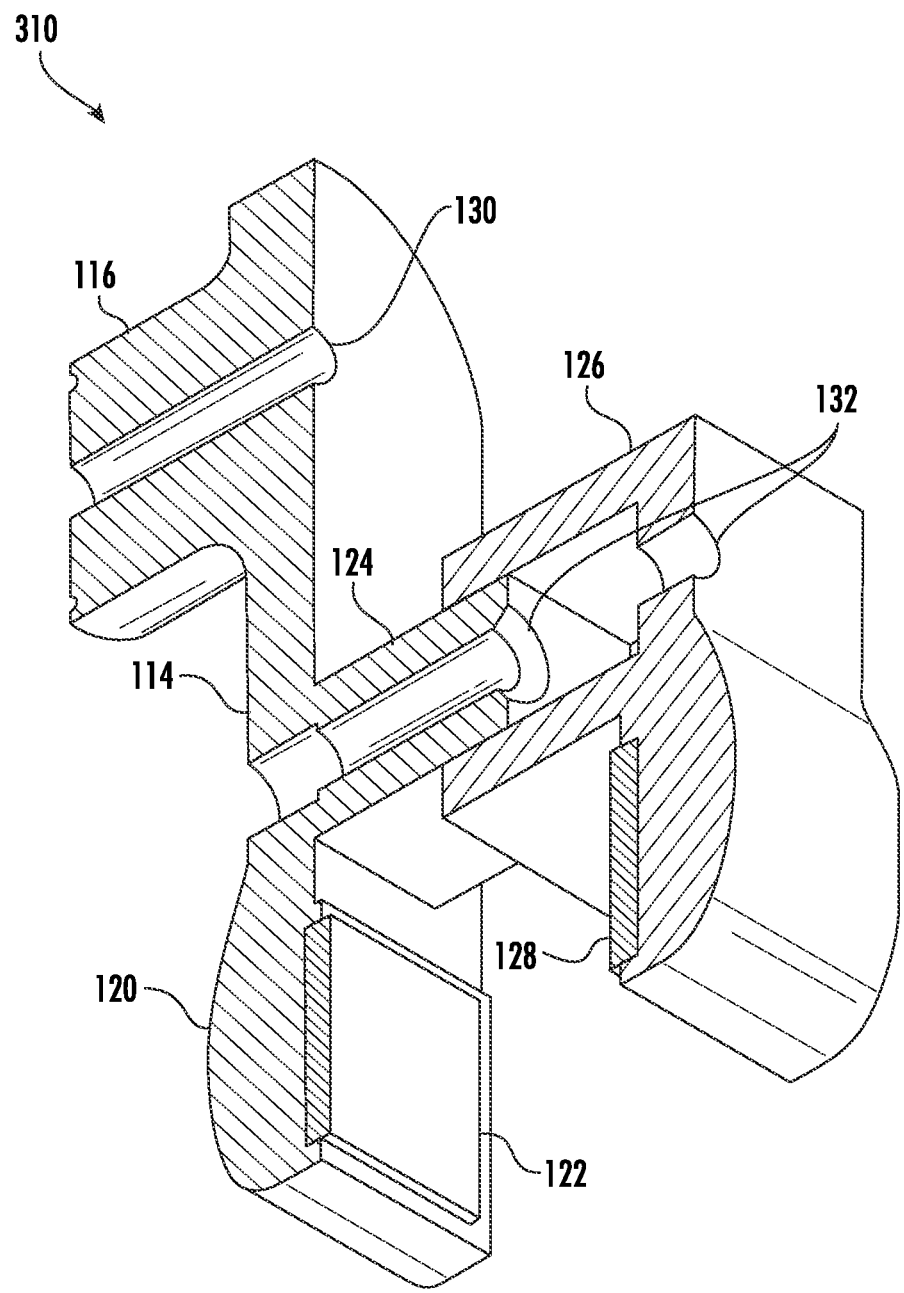
Figure 14:
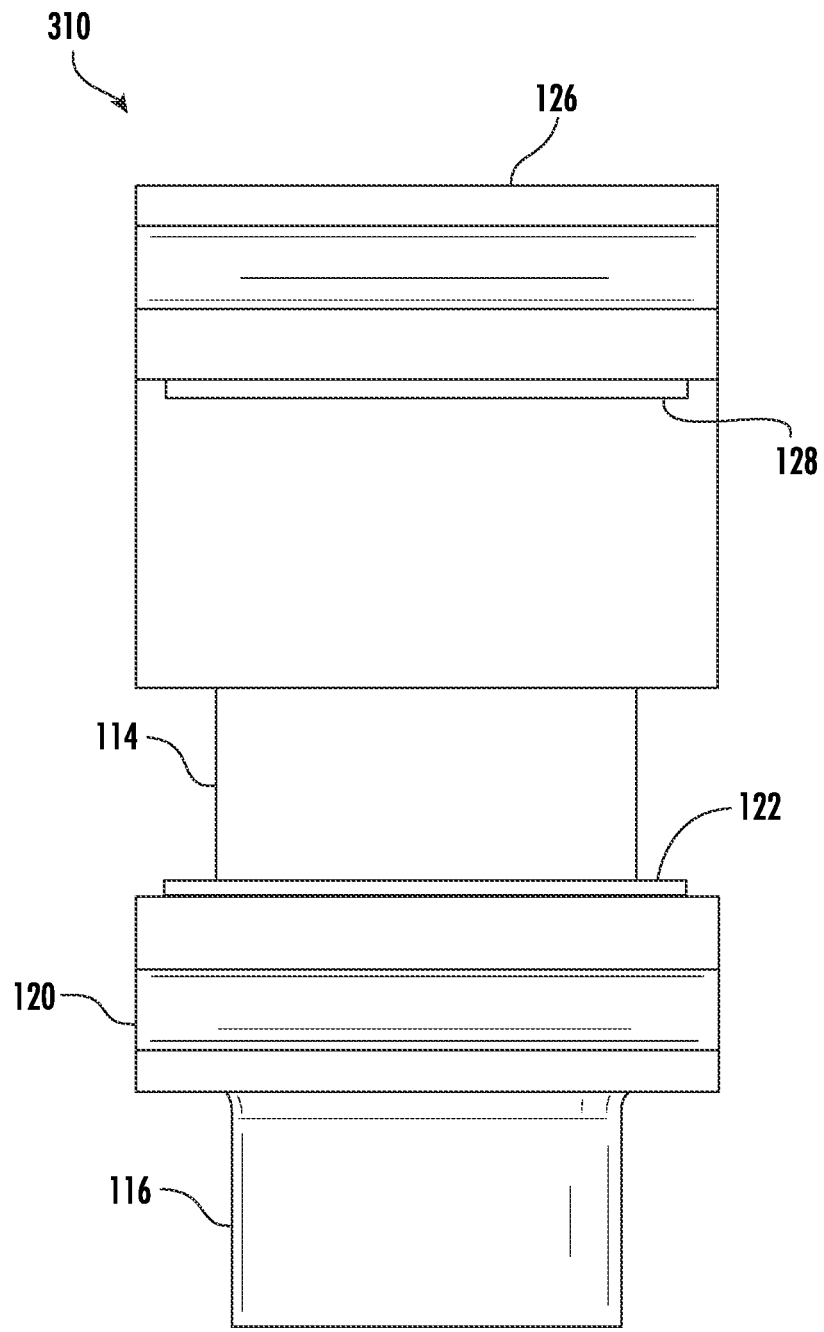
Figure 15:
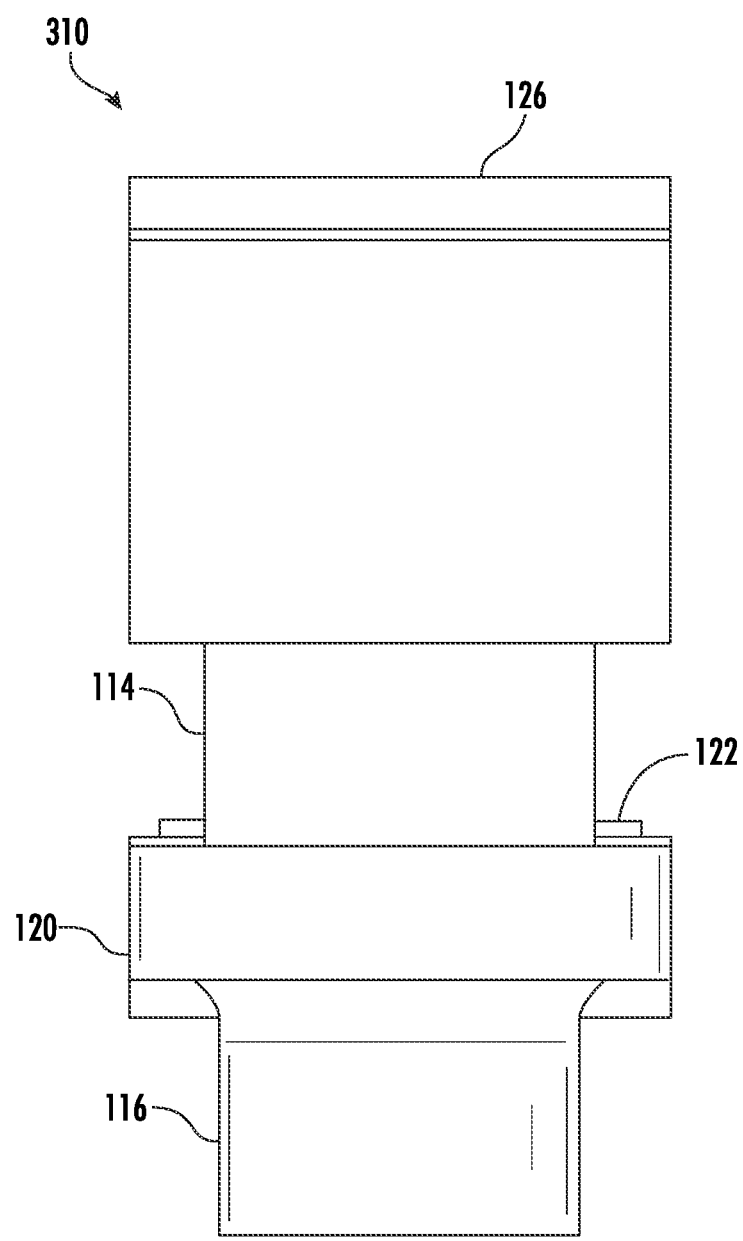
Figure 16:
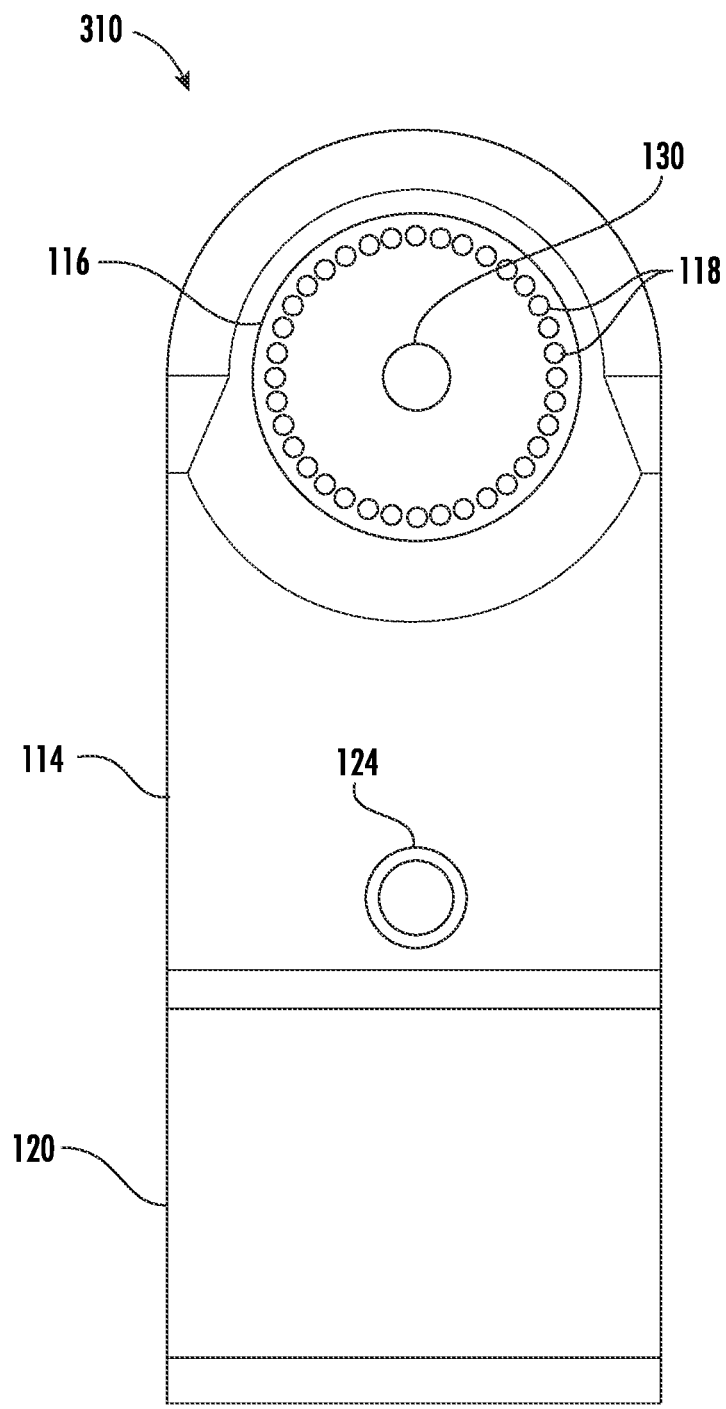
Figure 17:
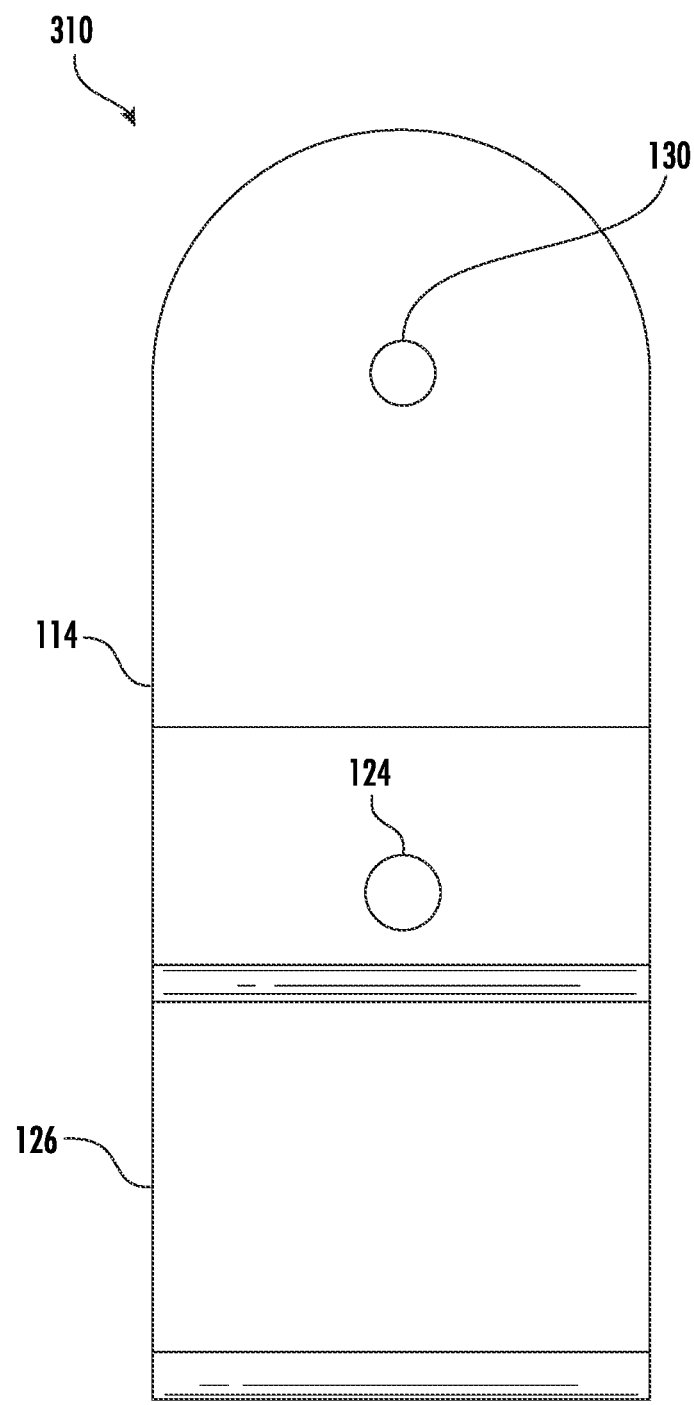
Figure 18:
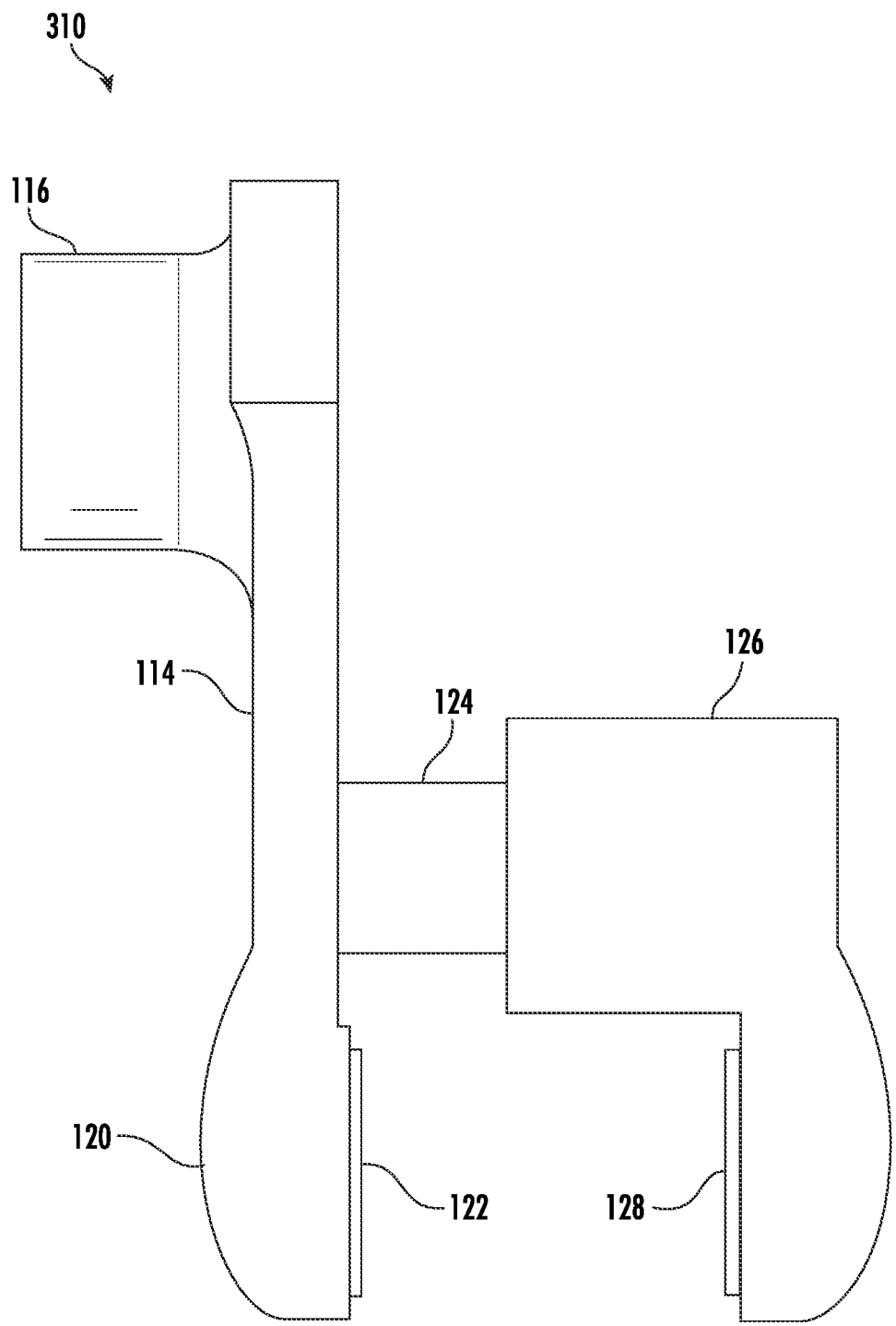

Referring now to FIG. 11 through FIG. 18 are various views of an example of clamp device 310 of portable drying system 105 shown in FIG. 5 through FIG. 9, which is one example of clamp device 110 of the portable drying system 100 shown in FIG. 1. For example, FIG. 11 shows a front perspective view, FIG. 12 shows a back perspective view, FIG. 13 shows a cross-sectional view, FIG. 14 shows a bottom view, FIG. 15 shows a top view, FIG. 16 shows a front view, FIG. 17 shows a back view, and FIG. 18 shows a side view of clamp device 310.

In this example, clamp device 310 may include a main arm 114 that has a mating portion 116 at one end and a clamp portion 120 at the opposite end. Mating portion 116 further includes certain locking features 118, such as a plurality of dimples or bumps, arranged in a circular line. Locking features 118 of mating portion 116 are designed to engage with opposite locking features of any airflow mount 160. Further, a clamp pad 122 may be provided on a clamping surface of clamp portion 120. Further, a slide member 124 protrudes from one side of main arm 114 about mid-way along its length.

Clamp device 310 may further include a clamp member 126 that is designed to engage with slide member 124 of main arm 114 and provide the opposite clamping surface to that of clamp portion 120 of main arm 114. Accordingly, a clamp pad 128 may be provided on a clamping surface of clamp member 126. Further, a thru-hole 130 may be provided through mating portion 116 of main arm 114. Further, a thru-hole 132 may be provided through slide member 124 of main arm 114 and extending through clamp member 126. Thru-holes 130 and 132 may be provided to receive fasteners that may be tightened and/or loosened. In one example, the clamping function of clamp device 310 is adjustable and wherein the clamp may open in the range of about 0.5 inches to about 1.5 inches wide, or other suitable width based. Generally, the components of clamp device 310 shown in FIG. 11 through FIG. 18 may be formed of any rigid, lightweight, and water-resistant material, such as, but not limited to, molded plastic, aluminum, and the like.

Further, and referring now to FIG. 13, clamp pad 122 and clamp pad 128 of clamp device 310 may sit in a recessed region to ensure their structural reliability.

Figure 19:
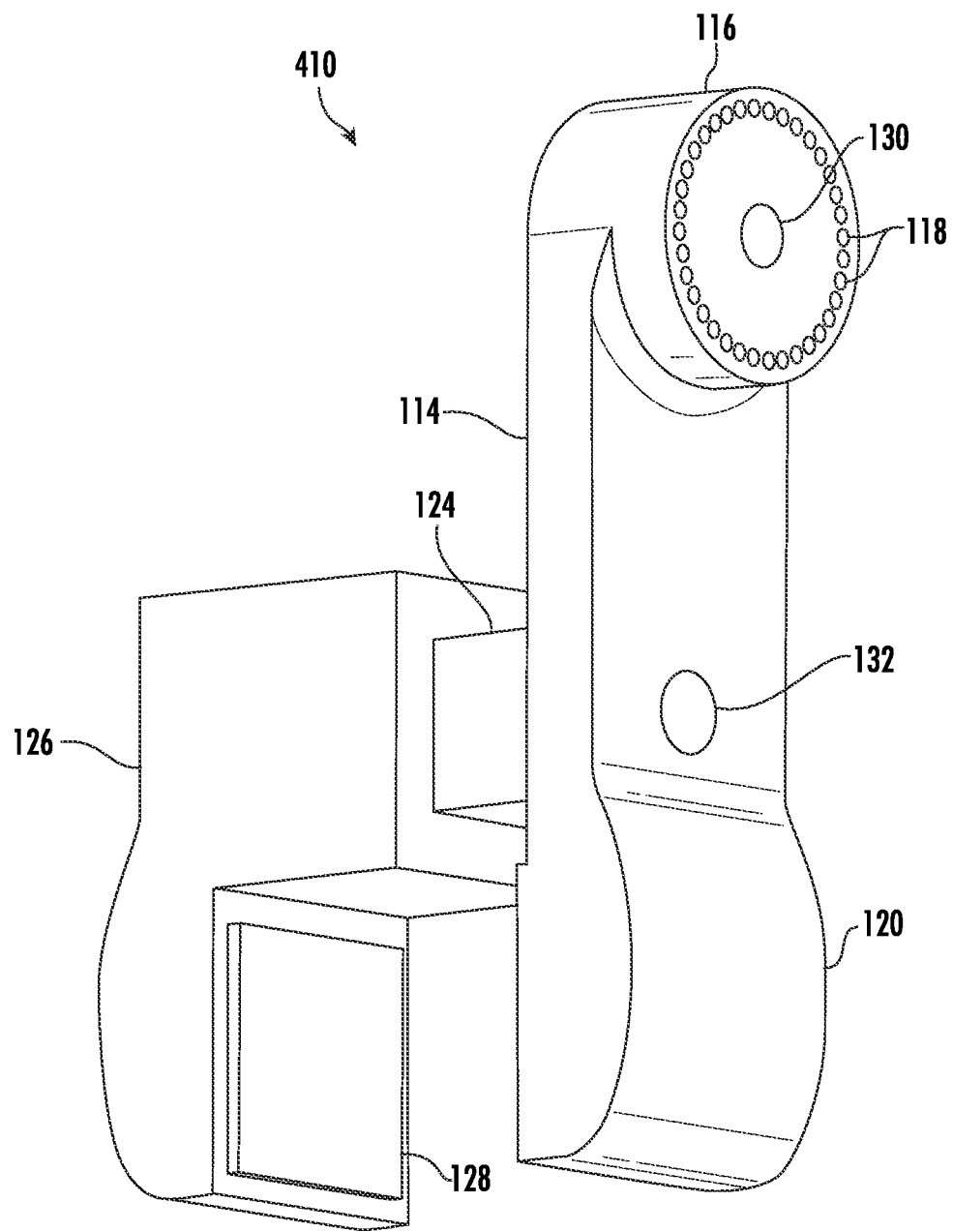
Figure 20:
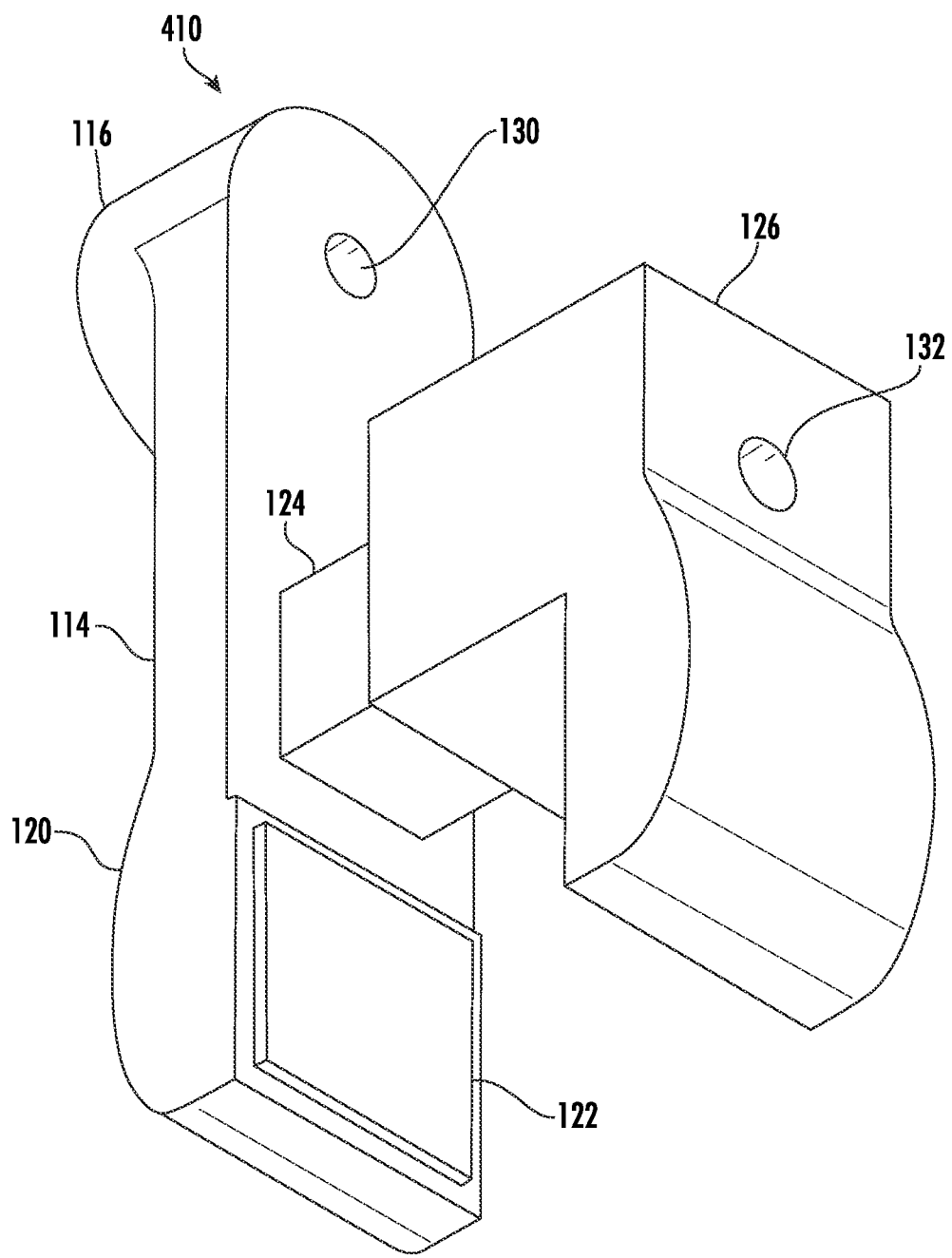
Figure 21:
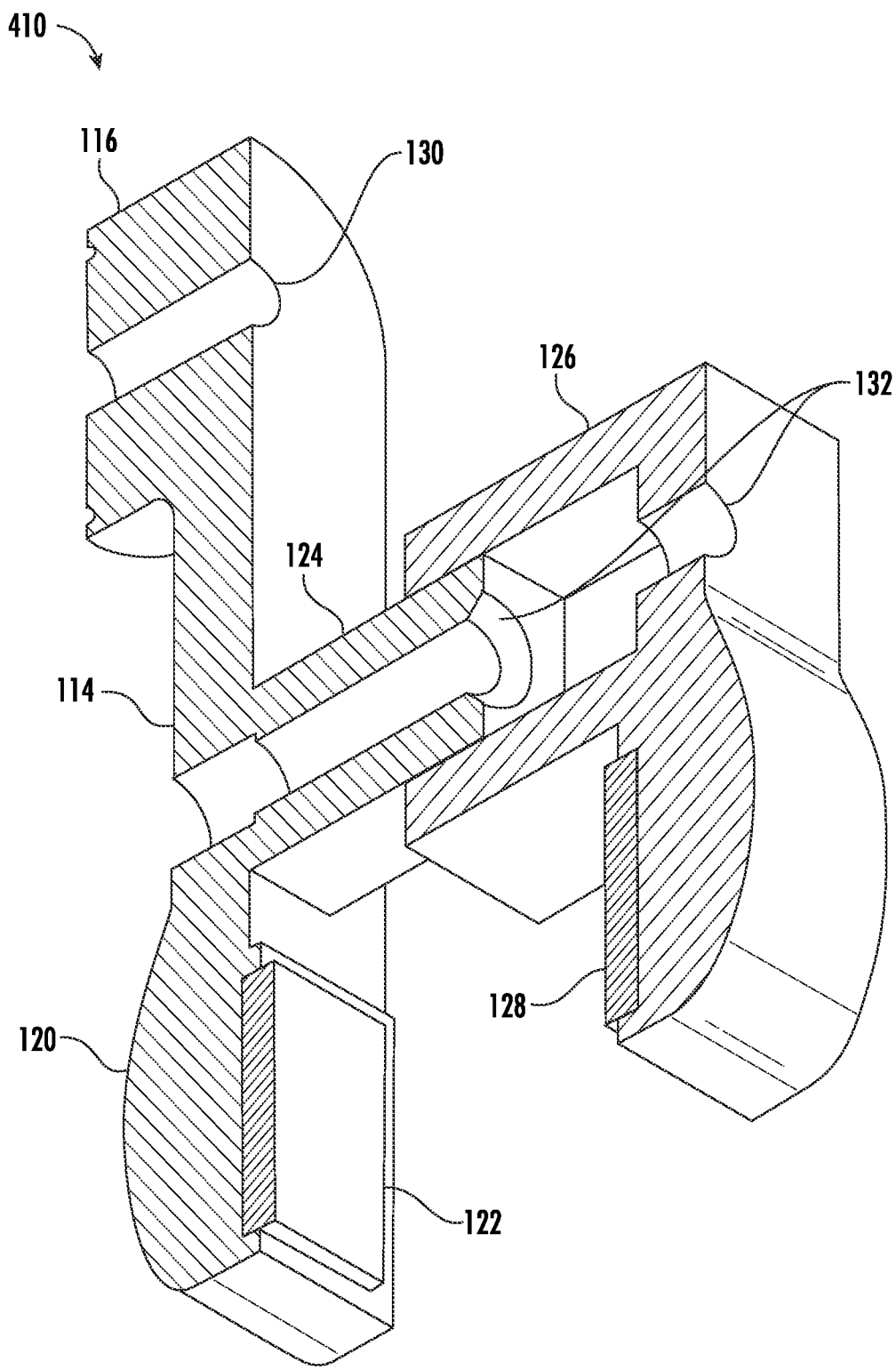
Figure 22:
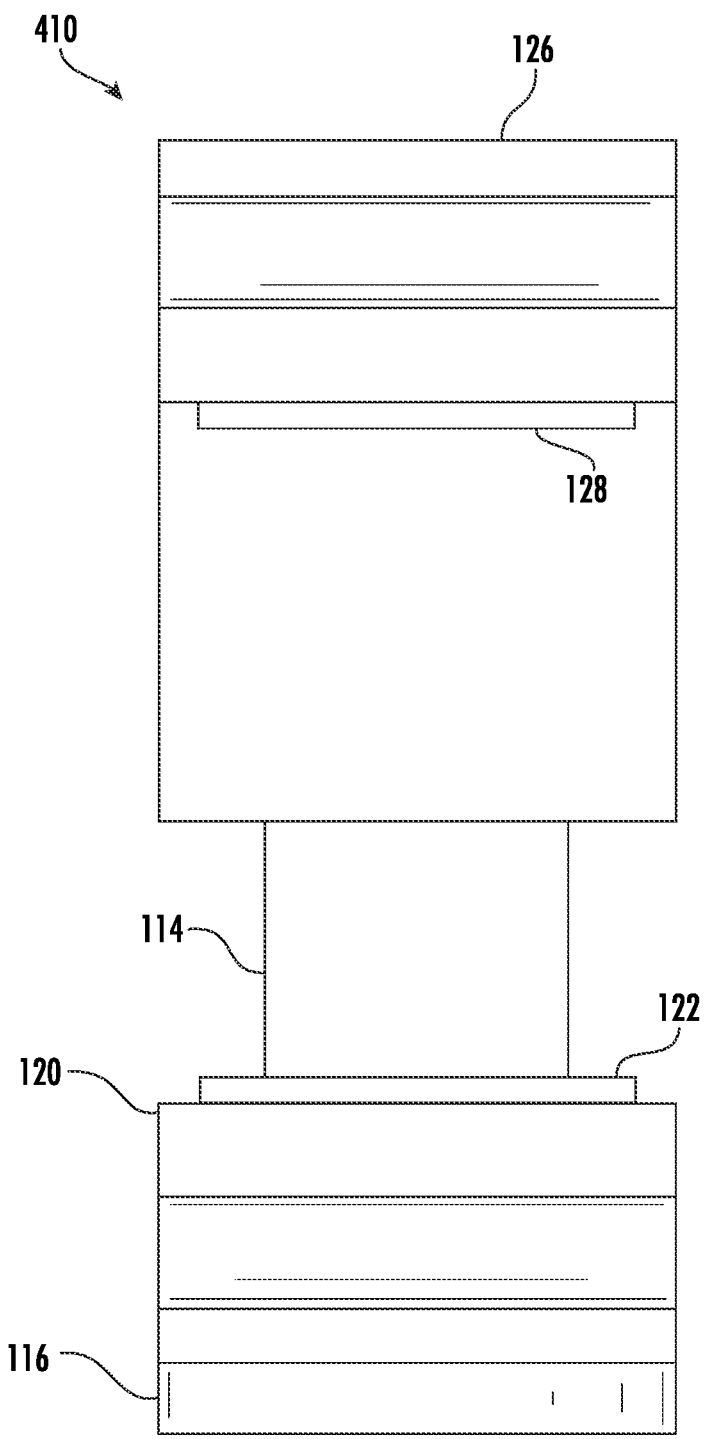
Figure 23:
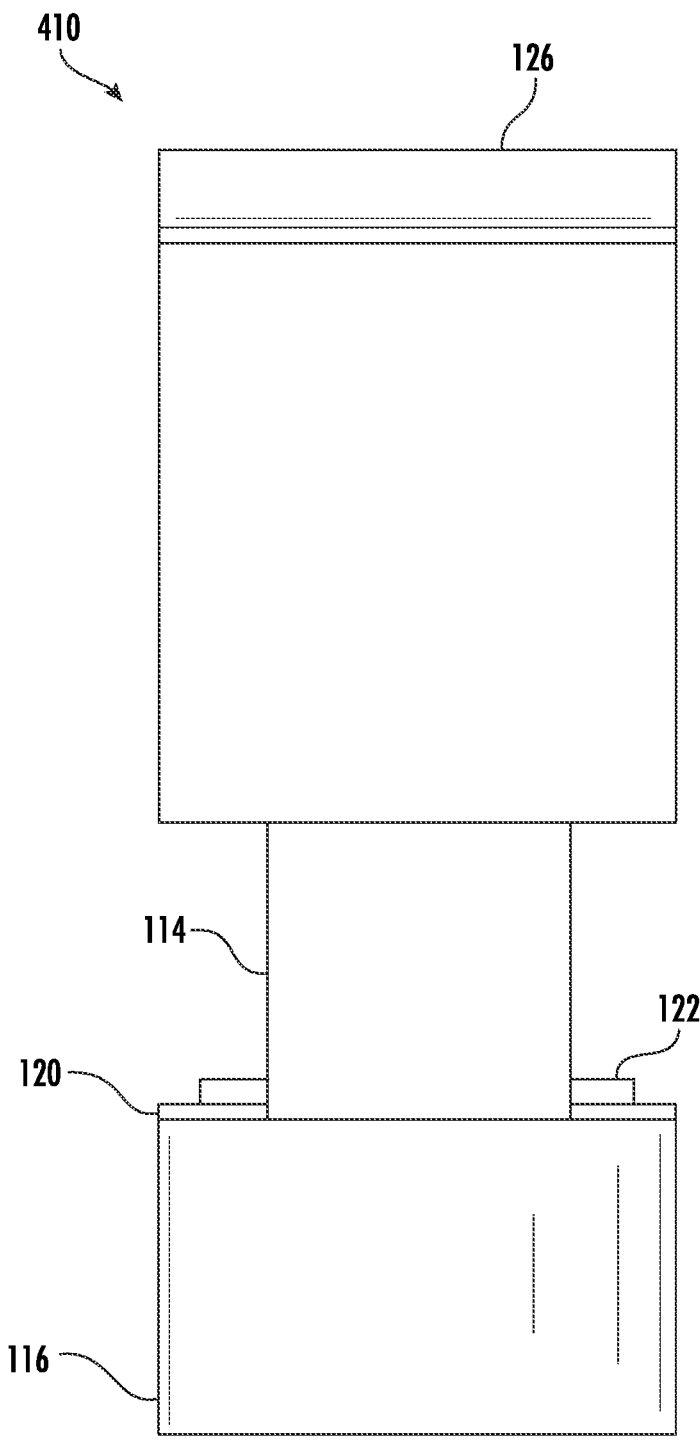
Figure 24:
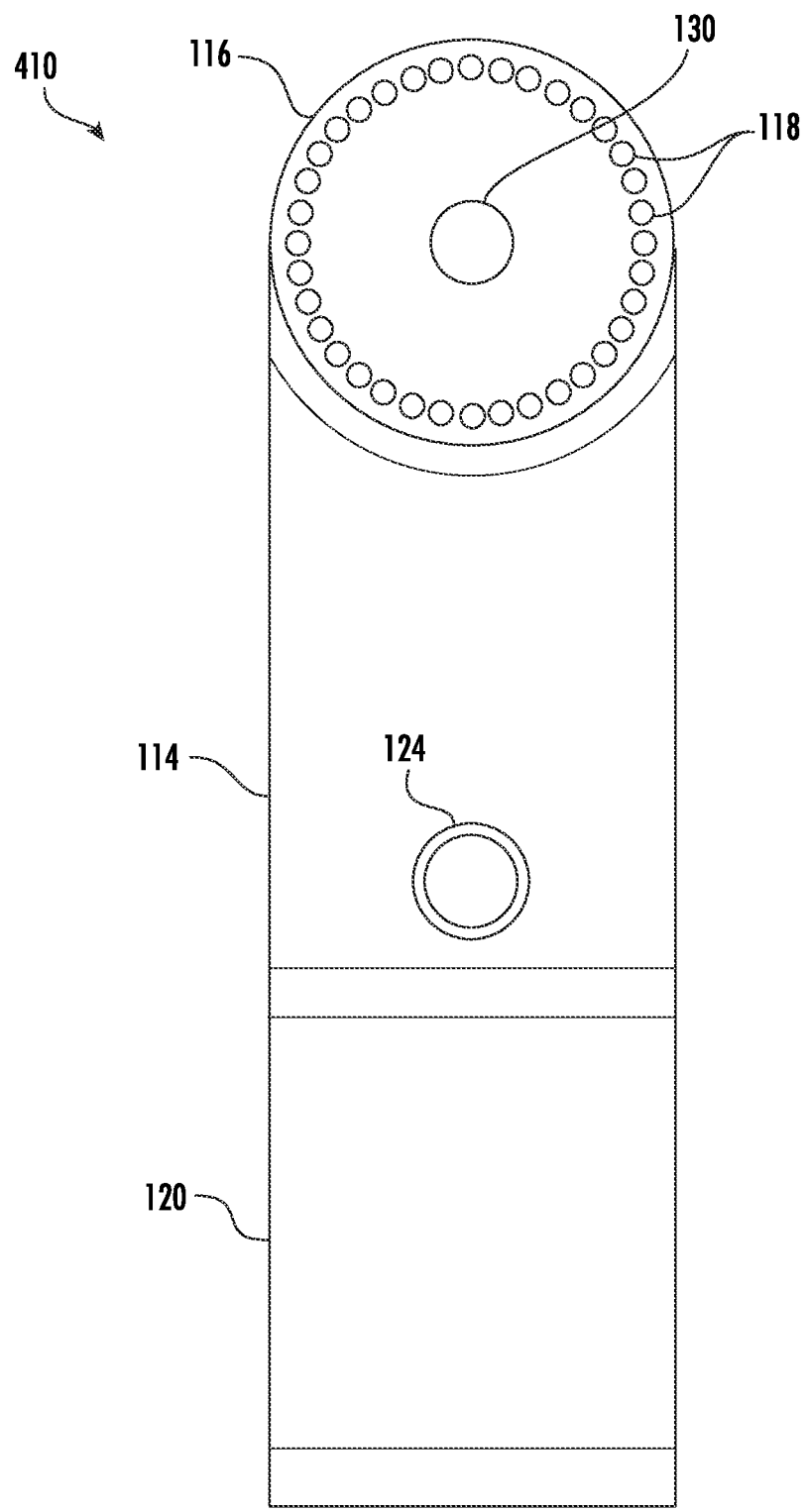
Figure 25:
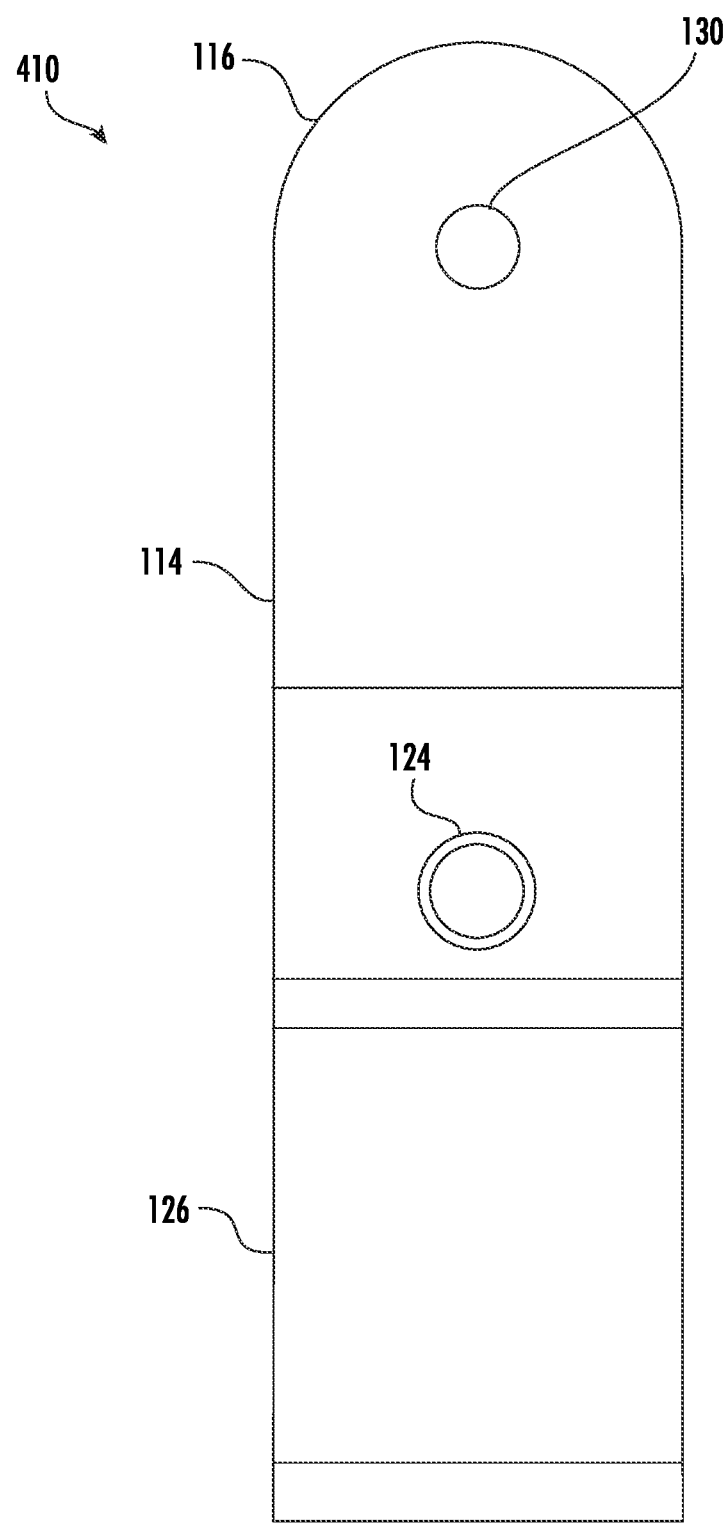
Figure 26:
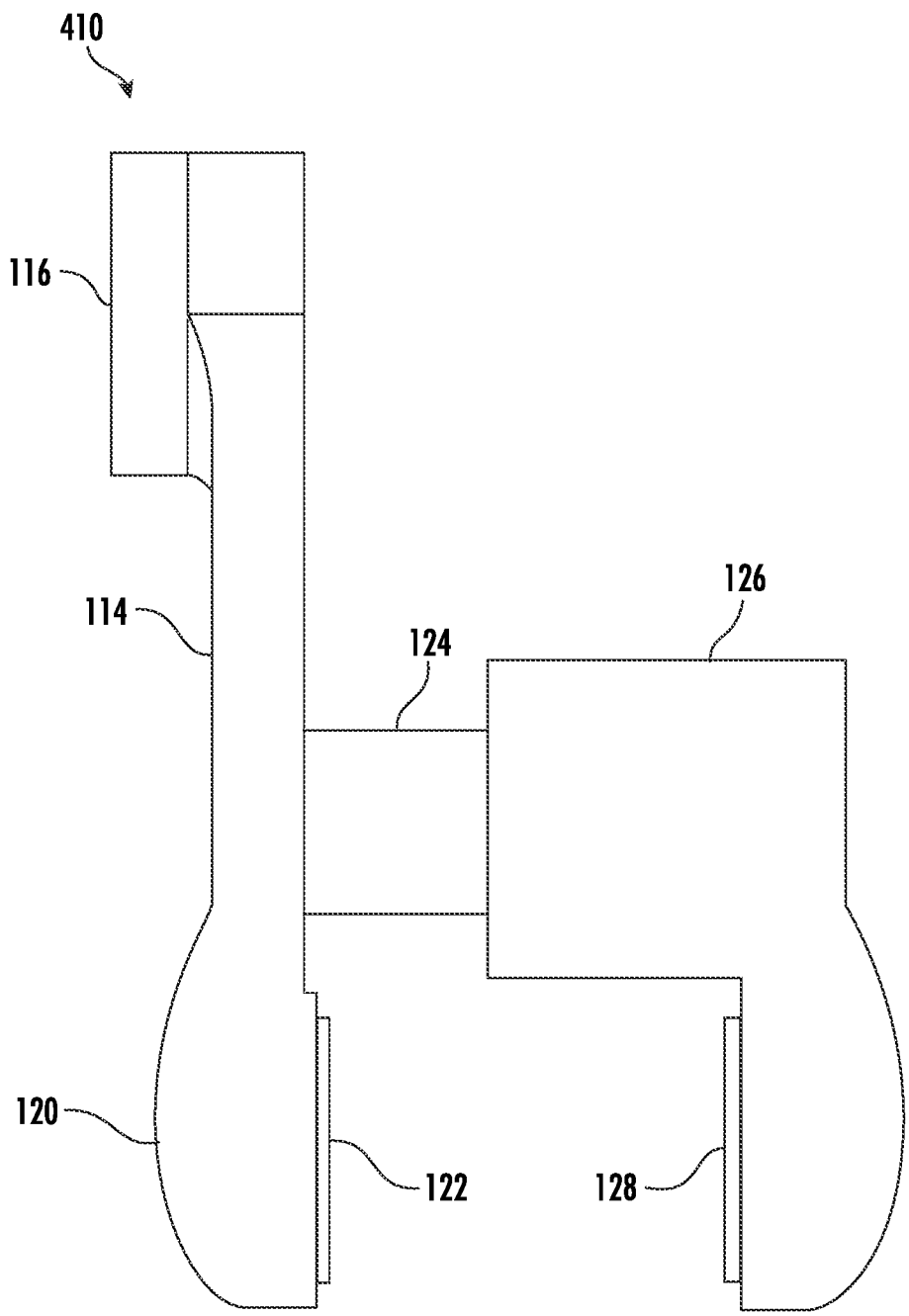

Referring now to FIG. 19 through FIG. 26 is various views of an example of clamp device 410 of portable drying system 105 shown in FIG. 5 through FIG. 9, which is another example of clamp device 110 of the portable drying system 100 shown in FIG. 1. For example, FIG. 19 shows a front perspective view, FIG. 20 shows a back perspective view, FIG. 21 shows a cross-sectional view, FIG. 22 shows a bottom view, FIG. 23 shows a top view, FIG. 24 shows a front view, FIG. 25 shows a back view, and FIG. 26 shows a side view of clamp device 410.

Clamp device 410 is substantially the same as clamp device 310 shown in FIG. 11 through FIG. 18 except that it may be sized and/or dimensioned differently. For example, clamp device 310 shown in FIG. 11 through FIG. 18 may be sized to handle a portable drying system 105 that includes blower fan 140. By contrast, clamp device 410 shown in FIG. 19 through FIG. 26 may be sized to handle a portable drying system 105 that is absent blower fan 140. That is, clamp device 310 may be sized larger than clamp device 410 because of the extra bulk and weight of blower fan 140. The clamp device 410 on the portable drying system 105 that is absent blower fan 140 can be made smaller to save cost, since the portable drying system 105 units that do not include the blower fan 140 are much lighter (and by extension have a much lower inertia). That is, the clamping forces required to hold the portable drying system 105 that is absent blower fan 140 from moving around, for example, during golf cart travel and while bouncing along through the bumps of the course are lower.

Further, and referring now to FIG. 21, clamp pad 122 and clamp pad 128 of clamp device 410 sit in a recessed region to ensure their structural reliability.

Generally, the components of clamp device 410 shown in FIG. 19 through FIG. 26 may be formed of any rigid, lightweight, and water-resistant material, such as, but not limited to, molded plastic, aluminum, and the like.

Figure 27:
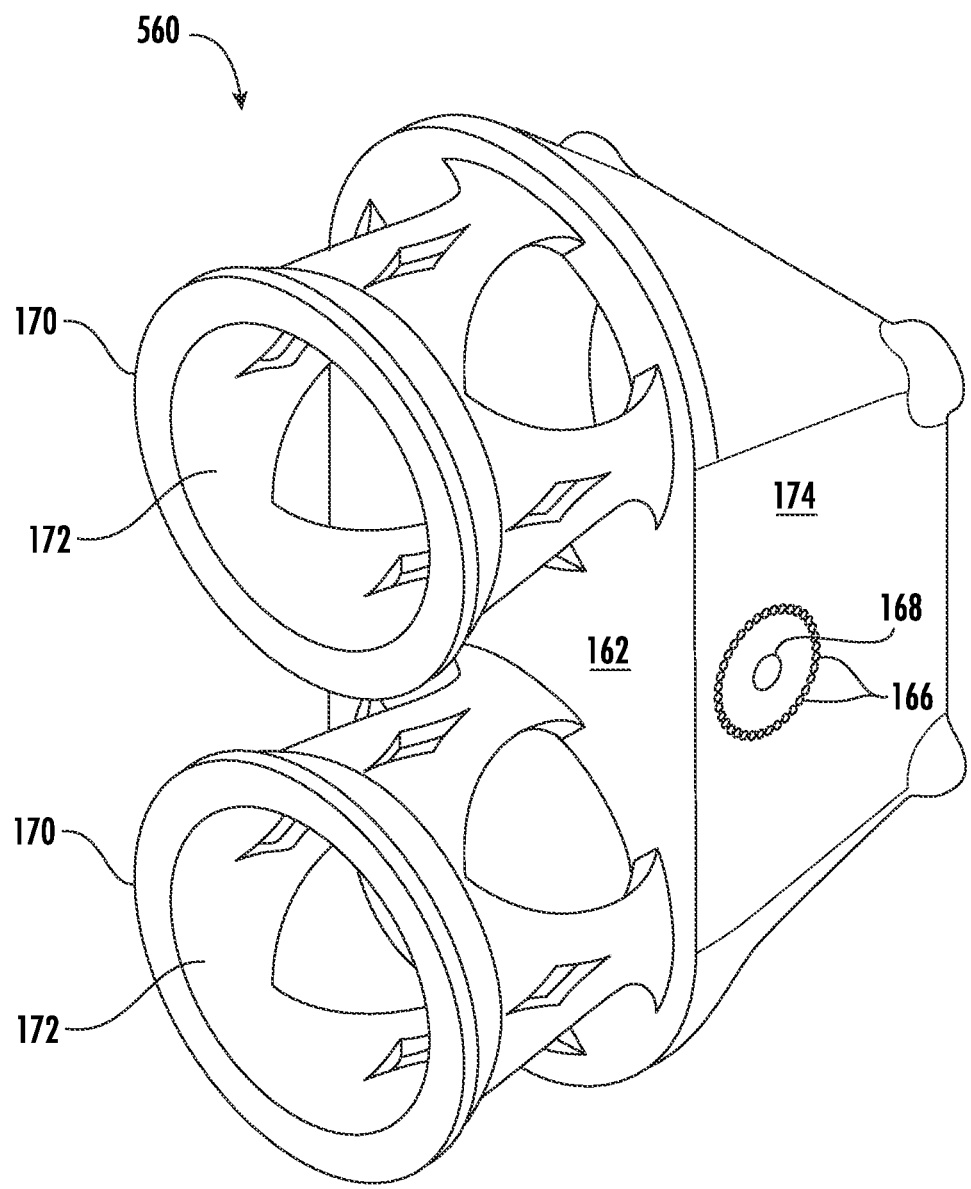
Figure 28:
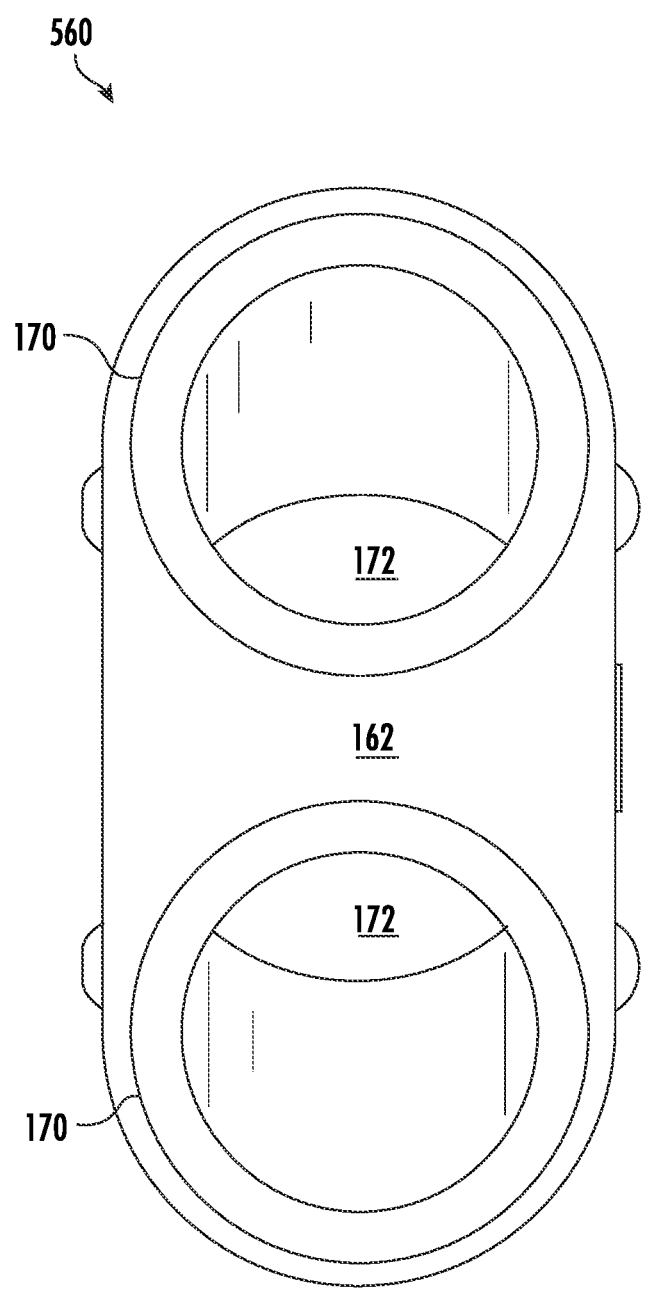
Figure 29:
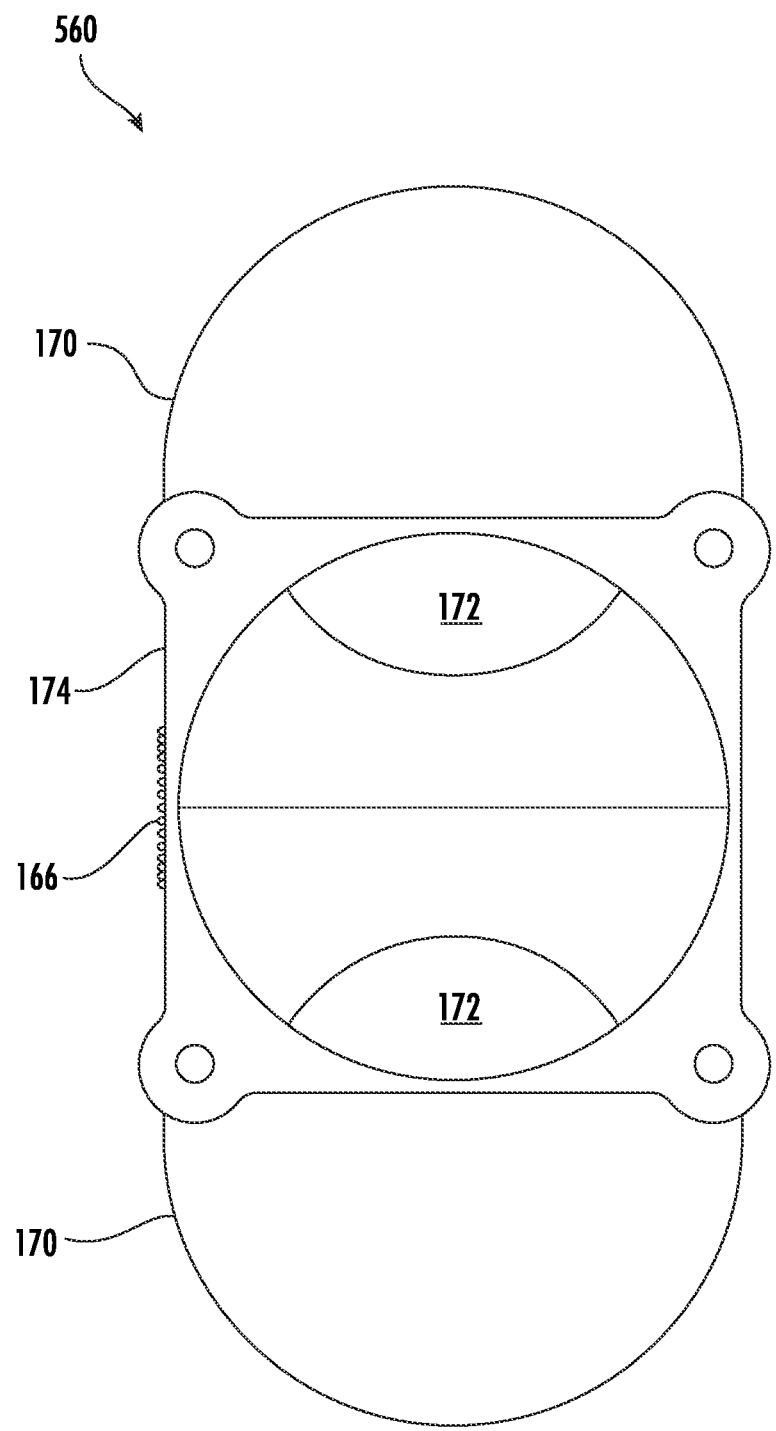
Figure 30:
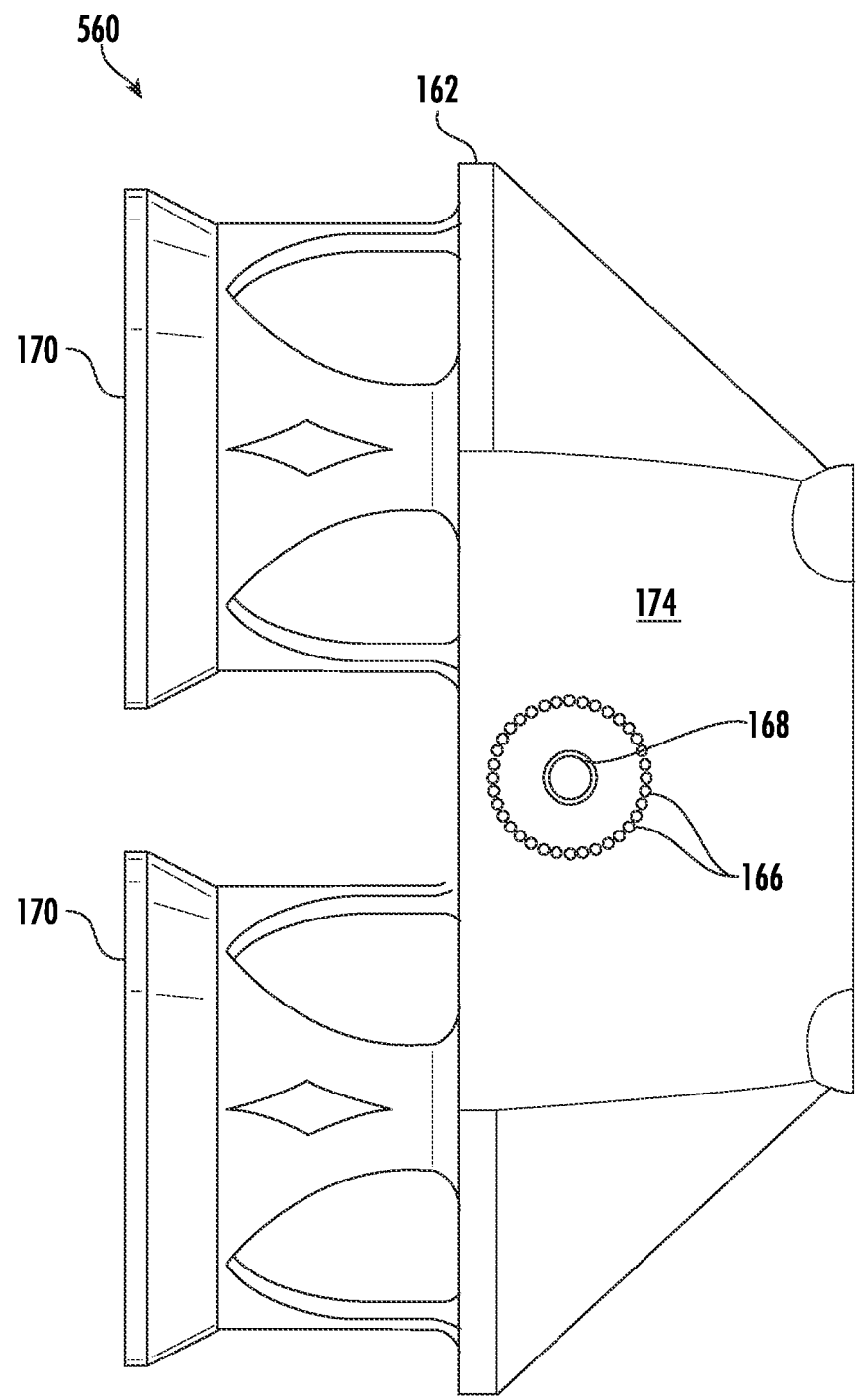

Referring now to FIG. 27 through FIG. 30 is various views of an example of airflow mount 560, which is an example of airflow mount 160 of the portable drying system 100 shown in FIG. 1. Further, airflow mount 560 is included in portable drying system 105 shown in FIG. 5 through FIG. 9. For example, FIG. 27 shows a perspective view, FIG. 28 shows a front view (i.e., the air outlet side), FIG. 29 shows a back view (i.e., the air inlet side), and FIG. 30 shows a side view of airflow mount 560.

In one example, airflow mount 560 may include a base plate 162 integrated atop a fan mount body 174 that is open to the rear to receive blower fan 140. Certain locking features 166, such as a plurality of dimples or bumps, may be arranged in a circular line on one side of fan mount body 174. The locking features 166 of airflow mount 560 are designed to engage with opposite locking features 118 of any clamp device 110 (e.g., clamp devices 310, 410).

Further, a thru-hole 168 is provide through fan mount body 174 and at about the center of the locking features 166. In this example, airflow mount 560 is a two-port airflow mount, meaning that it is capable of holding, for example, two golf gloves 215. Accordingly, airflow mount 560 may include a pair of holder frames 170. Each of the holder frames 170 defines an airflow channel 172 from fan mount body 174 and through which air may flow.

In this example, each of the holder frames 170 may be sized to receive a golf glove 215. More particularly, holder frames 170 may be sized to receive a men's or a women's or a junior size golf glove 215. In one example, for a men's size golf glove, the top diameter of holder frame 170 may be in the range of about 70 mm to about 74 mm, e.g., about 72 mm, the neck diameter of holder frame 170 may be in the range of about 60 mm to about 64 mm, e.g., about 62 mm, the base to top distance of holder frame 170 may be in the range of about 44 mm to about 48 mm, e.g., about 46.6 mm, the top to neck distance of holder frame 170 may be in the range of about 10 mm to about 15 mm, e.g., about 13 mm, the top straight lip of holder frame 170 may be in the range of about 1 mm to about 5 mm, e.g., about 3 mm, and the center to center spacing between two holder frames 170 may be in the range of about 90 mm to about 94 mm, e.g., about 92 mm.

In another example, for a women's or junior size golf glove, the top diameter of holder frame 170 may be in the range of about 54 mm to about 58 mm, e.g., about 56 mm, the neck diameter of holder frame 170 may be in the range of about 45 mm to about 51 mm, e.g., about 48.2 mm, the base to top distance of holder frame 170 may be in the range of about 34 mm to about 39 mm, e.g., about 36.6 mm, the top to neck distance of holder frame 170 may be in the range of about 10 mm to about 15 mm, e.g., about 13 mm, the top straight lip of holder frame 170 may be in the range of about 1 mm to about 5 mm, e.g., about 3 mm, and the center to center spacing between two holder frames 170 may be in the range of about 78 mm to about 72 mm, e.g., about 80 mm.

Generally, airflow mount 560 shown in FIG. 27 through FIG. 30 may be formed of any rigid, lightweight, and water-resistant material, such as, but not limited to, molded plastic, aluminum, and the like.

Referring now to FIG. 33, FIG. 34, and FIG. 35 is various views of an example of airflow mount 660, which is another example of airflow mount 160 of the portable drying system 100 shown in FIG. 1. In this example, airflow mount 660 may be a three-port airflow mount, meaning that it is capable of holding, for example, three golf gloves 215. For example, FIG. 33 shows a side perspective view, FIG. 34 shows a back perspective view, and FIG. 35 shows a side view of airflow mount 660.

In this example, the three holder frames 170 are arranged in a triangular configuration. Further, differing from airflow mount 560 shown in FIG. 27 through FIG. 30, airflow mount 660 is absent fan mount body 174. Rather, it includes the three holder frames 170 mounted atop base plate 162 only. According, airflow mount 660 further includes a mating portion 164 on one side or edge of base plate 162. Mating portion 164 includes the circular arrangement of locking features 166. The locking features 166 of airflow mount 660 are designed to engage with opposite locking features 118 of any clamp device 110 (e.g., clamp devices 310, 410).

Generally, airflow mount 660 shown in FIG. 33, FIG. 33, and FIG. 35 may be formed of any rigid, lightweight, and water-resistant material, such as, but not limited to, molded plastic, aluminum, and the like.

Referring now to FIG. 36, FIG. 37, and FIG. 38 is various views of an example of airflow mount 760, which is yet another example of airflow mount 160 of the portable drying system 100 shown in FIG. 1. In this example, airflow mount 760 may be a two-port airflow mount, meaning that it is capable of holding, for example, two golf gloves 215. For example, FIG. 36 shows a side perspective view, FIG. 37 shows an end view, and FIG. 38 shows a side view of airflow mount 760. Airflow mount 760 is substantially the same as airflow mount 660 shown in FIG. 33, FIG. 34, and FIG. 35 except that it includes two holder frames 170 instead of three.

Generally, airflow mount 760 shown in FIG. 36, FIG. 37, and FIG. 38 may be formed of any rigid, lightweight, and water-resistant material, such as, but not limited to, molded plastic, aluminum, and the like.

Referring now to FIG. 39, FIG. 40, and FIG. 41 is various views of an example of airflow mount 860, which is still another example of airflow mount 160 of the portable drying system 100 shown in FIG. 1. In this example, airflow mount 860 may be a three-port airflow mount, meaning that it is capable of holding, for example, three golf gloves 215. For example, FIG. 39 shows a side perspective view, FIG. 40 shows an end view, and FIG. 41 shows a side view of airflow mount 860. Airflow mount 860 is substantially the same as airflow mount 760 shown in FIG. 36, FIG. 37, and FIG. 38 except that it includes three holder frames 170 arranged in a line instead of two.

Airflow mount 160 of portable drying system 100 is not limited to the examples shown hereinabove with reference to FIG. 27 through FIG. 41. These are exemplary only. For example, airflow mount 160 of portable drying system 100 may be implemented to include any number, arrangement, and size of holder frames 170.

Generally, airflow mount 860 shown in FIG. 39, FIG. 40, and FIG. 41 may be formed of any rigid, lightweight, and water-resistant material, such as, but not limited to, molded plastic, aluminum, and the like.

Referring now to FIG. 42 is various views of an example of blower fan 140 of the portable drying system 100 shown in FIG. 1. Again, blower fan 140 may be, for example, a standard DC powered muffin fan, such as a 5-volt, 12-volt, or 24-volt DC muffin fan. The footprint of blower fan 140 may be, for example, 3 to 4 inches square or 3 to 4 inches round. By way of example, FIG. 42 shows a perspective view, a front view, and a side view of a standard muffin fan. In this example, blower fan 140 may include a power wire of cable that has a USB connector for plugging into, for example a 5 volt battery or a separate USB power source. In one example, the USB connector may have a 5 volt to 12 volt regulator built in.

In one embodiment, portable drying system 100 may include a timer relay 198, such as a 12 volt digital timer relay. The timer relay 198 may be in communication with controller 196 and/or any one or more of the powered components of the portable drying system 100, e.g., heater 190, light source 192, blower fan 140, and/or power source 142. Timer relay 198 may include an adjustment mechanism, and would allow, for example, a user to set a time of operation of one or more of the powered components of the portable drying system 100, for example heater 190, so the powered component will run for a set period of time and then cut off automatically, e.g., after 15 minutes, or other suitable amount of time. Timer relay 198 would allow the user to optimize battery time by limiting the time any one or more of the powered components of the portable drying system 100 are running.

In one embodiment, one or more of the components of the portable drying system 100, for example, but not limited to, one or more of the controller 196, timer relay 198, heater 190, light source 192, blower fan 140, battery pack 542, battery 544, and/or desiccant pack holder 194 may be housed or partially housed in a housing 197.

Referring now to FIG. 43 is a flow diagram of an example of a method 900 of using the portable drying system 100 for conveniently drying an article of clothing, in accordance with an embodiment of the invention. Method 900 may include, but is not limited to, the following steps.

At a step 910, a portable drying system is provided. For example, portable drying system 100 may be provided, as described hereinabove with reference to FIG. 1 through FIG. 43. Further, portable drying system 100 may be provided for conveniently drying an article of clothing, such as subject articles 215. In another example, portable drying system 105 as shown in FIG. 5 through FIG. 9 may be provided for conveniently drying an article of clothing, such as, but not limited to, one or more golf gloves 215.

At a step 915, the clamp device of the portable drying system is coupled to a holding article. For example, clamp device 110 of portable drying system 100 shown in FIG. 1 may be coupled to holding article 210. In another example, clamp device 310 shown in FIG. 11 through FIG. 18 may be coupled to holding article 210, such as to golf cart 210. In another example, clamp device 410 shown in FIG. 19 through FIG. 26 may be coupled to holding article 210, such as to golf cart 210. In yet another example, and referring now to FIG. 44A (not drawn to scale), portable drying system 105 (see FIG. 5 through FIG. 9) including clamp device 310 may be affixed to golf cart 210. In this example, portable drying system 105 is oriented such that airflow mount 560 is facing the rear of golf cart 210. This orientation serves to assist the airflow for drying when golf cart 210 is moving.

In one preferred embodiment, the clamp device 310, 410, when coupled to the holding article 210, for example, a golf cart, may be configured such that a standard golf cart windshield, such as a plexiglass wind screen, found commonly on most golf carts, can be placed in their upright position (closed) and the clamp device 310, 410 does not interfere with its operation. That is, the clamp device 310, 410, may be generally C-shaped, and when installed on a front post of the windshield frame of a golf cart, no portion of the clamp device 310, 410 would wrap around a front side of the windshield frame post, and would therefore not interfere with the operation of the windshield. The portable drying system 100 may be attached to any post of the golf cart, and may be positioned either outboard or inboard of a cab of the golf cart.

At a step 920, the article to be dried is installed on the airflow mount of the portable drying system. For example, subject article 215 to be dried is installed on airflow mount 160 of the portable drying system 100 shown in FIG. 1 and FIG. 3. In another example, and referring now to FIG. 44B (not drawn to scale), golf gloves 215 to be dried is installed on airflow mount 560 of the portable drying system 105. In this example, the fingers of golf gloves 215 are facing the rear of golf cart 210.

In one example, each of the golf gloves 215 may be held by wrapping it around the protrusions of holder frames 170 of airflow mount 560 and then tightening the Velcro around the protrusions like one would tighten it around one's wrist. The basic shape of holder frames 170 has a neck which mimics the wrist. Then, the top, lip, and top to neck transition, which mimics the decreasing size from the hand to the wrist. This captures the glove onto the protrusion, like it is captured when wearing. In one example, the clamp device 310, 410 may be connected to either side post of, for example, a golf cart, and the rotationally adjusted so the centerline of an installed golf glove 215 along its length may be parallel to the ground.

At a step 925, if present, one or more of the powered drying components of the portable drying system, such as heater 190, blower fan 140, and/or light source 192 may be activated by for example an activation (or power) switch. For example, heater 190 of portable drying system 100 shown in FIG. 1 may be activated. In one embodiment, timer relay 198 may be set such that the heater 190 runs for a set period of time, e.g., 15 minutes. In another embodiment, without a powered drying component, the method 900 would end. In such an embodiment, air flow from the holding article moving (e.g., a golf cart) would act to dry the article.

Referring now to FIG. 45 is a block diagram of an example of a portable drying system 1000 in a networked system configuration and including wireless communication capability, in accordance with an embodiment of the invention. In this example, portable drying system 1000 may be a networked system that may include clamp device 110, blower fan 140, power source 142, airflow mount 160, heater 190, light source 192, controller 196, timer relay 198, and/or desiccant pack holder 194 as described hereinabove with reference to FIG. 1. However, portable drying system 1000 may further include a communications interface 1010.

Further, a user 102 may be associated with portable drying system 1000. In one example, user 102 may be a golfer. User 102 may have a portable smart device 1020 for communicating with controller 196 and/or any one or more of timer relay 198, blower fan 140, power source 142, heater 190, and/or light source 192. Portable smart device 1020 may be, for example, a mobile phone (or smart phone), a tablet device, a smartwatch, and/or the like.

A drying system mobile app 1022 may be installed and running on the user 102's portable smart device 1020. In one example, drying system mobile app 1022 may be implemented, for example, as a .NET application, a desktop application, a mobile app, an application program interface (API), and the like. Drying system mobile app 1022 may be designed to operate on any device platform, including for example, Windows, Android, Apple, and the like. Accordingly, user 102 may interact with controller 196 using drying system mobile app 1022 for controlling any one or more of timer relay 198, blower fan 140, power source 142, heater 190, and/or light source 192.

Communications interface 1010 may be any wireless communication interface by which information may be exchanged with other devices, such as the user 102's portable smart device 1020. Examples of wireless communication interfaces may include, but are not limited to, an Intranet connection, Internet, ISM, Bluetooth® technology, Bluetooth® Low Energy (BLE) technology, Wi-Fi, Wi-Max, IEEE 402.11 technology, ZigBee technology, Z-Wave technology, 6LoWPAN technology (i.e., IPv6 over Low Power Wireless Area Network (6LoWPAN)), ANT or ANT+ (Advanced Network Tools) technology, radio frequency (RF), Infrared Data Association (IrDA) compatible protocols, Local Area Networks (LAN), Wide Area Networks (WAN), Shared Wireless Access Protocol (SWAP), any combinations thereof, and other types of wireless networking protocols.

Further, while light source 192 may be installed external to airflow mount 160 but directed toward, for example, golf gloves 215. In another example, one or more light sources 192 may be arranged inside each of the holder frames 170 of airflow mount 160 and in the airflow path.

In summary and referring now again to FIG. 1 through FIG. 45, portable drying system 100, 105, and/or 1000 and method 900 may provide clamp device 110, 310, and/or 410 for coupling to any holding article 210 for holding any subject article 215 to be dried. In one example, portable drying system 100, 105, and/or 1000 and method 900 may provide clamp device 110, 310, and/or 410 for coupling to any portion of a golf cart 210 for holding one or more golf gloves 215 to be dried.

In some embodiments, portable drying system 100, 105, and/or 1000 and method 900 may provide an airflow mount 106, such as airflow mounts 560, 660, 760, and 860, that may include one or more substantially circular holder frames 170, such as, but not limited to, three holder frames 170 arranged in a triangular configuration (e.g., airflow mount 660), three holder frames 170 arranged in a line (e.g., airflow mount 860), two holder frames 170 arranged side-by-side (e.g., airflow mounts 560, 760), one holder frame 170, and so on.

In some embodiments, portable drying system 100, 105, and/or 1000 and method 900 may provide clamp device 110, 310, and/or 410 and airflow mount 160, 560, 660, 760, and/or 860, absent blower fan 140.

In some embodiments, portable drying system 100, 105, and/or 1000 and method 900 may provide a networked system that may include clamp device 110, blower fan 140, power source 142, airflow mount 160, controller 196, heater 190, and communications interface 1010 for communicating wirelessly with, for example, drying system mobile app 1022 installed on smart device 1020, such as a mobile phone, and wherein a user 102 may communicate wirelessly with portable drying system 100, 105, and/or 1000 to control controller 196, timer relay 198, blower fan 140, power source 142, heater 190, and/or light source 192 using drying system mobile app 1022.

Following long-standing patent law convention, the terms "a," "an," and "the" refer to "one or more" when used in this application, including the claims. Thus, for example, reference to "a subject" includes a plurality of subjects, unless the context clearly is to the contrary (e.g., a plurality of subjects), and so forth.

Throughout this specification and the claims, the terms "comprise," "comprises," and "comprising" are used in a non-exclusive sense, except where the context requires otherwise. Likewise, the term "include" and its grammatical variants are intended to be non-limiting, such that recitation of items in a list is not to the exclusion of other like items that can be substituted or added to the listed items.

For the purposes of this specification and appended claims, unless otherwise indicated, all numbers expressing amounts, sizes, dimensions, proportions, shapes, formulations, parameters, percentages, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the subject matter of the present invention. For example, the term "about," when referring to a value can be meant to encompass variations of, in some embodiments ±100%, in some embodiments ±50%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

Although the foregoing subject matter has been described in some detail by way of illustration and example for purposes of clarity of understanding, it will be understood by those skilled in the art that certain changes and modifications can be practiced within the scope of the appended claims.

That which is claimed:

1. A portable drying system, comprising:
   a. a base plate;
   b. one or more holder frames disposed on a first side of the base plate, wherein each of the one or more holder frames define an airflow channel therethrough, each airflow channel extending through the base plate;
   c. a blower fan disposed at a second side of the base plate opposite that of the one or more holder frames, wherein the blower fan is configured to blow air into the airflow channel of one or more of the one or more holder frames;
   d. a heater mounted in-line with the blower fan, wherein the heater is one of upstream or downstream of the blower fan and is configured to provide radiant heat to one or more articles installed on one or more of the one or more holder frames; and
   e. an attachment mechanism, wherein the attachment mechanism is configured to attach the portable drying system to another structure.

2. The system of claim 1, wherein the attachment mechanism comprises an adjustable clamp device having a generally C-shape.

3. The system of claim 1, wherein the one or more holder frames are generally circular in shape.

4. The system of claim 1, wherein the one or more holder frames comprise one or more cut out portions about a periphery thereof.

5. The system of claim 1, wherein the one or more holder frames are configure to receive a glove thereon.

6. The system of claim 1, wherein the base plate further comprises a first attachment mating portion, and wherein the first attachment mating portion is configured to engage with a corresponding one of a second attachment mating portion of the attachment mechanism.

7. The system of claim 6, wherein the first attachment mating portion comprises first locking features, and wherein the first locking features are configured to engage with corresponding ones of second locking features of the second attachment mating portion, and wherein when the first locking features are engaged with the corresponding ones of the second locking features the first attachment mating portion and the second attachment mating portion are locked in place relative to one another, and when the first locking features are not engaged with the corresponding ones of the second locking features the first attachment mating portion and the second attachment mating portion are rotatable about one another.

8. The system of claim 7, wherein the first locking features comprise one of dimples or bumps and the second locking feature comprises another of the one of corresponding dimples or bumps, and wherein the dimples or bumps are arranged in a circular line.

9. The system of claim 1, further comprising a fan mount body, wherein the fan mount body is at least partially hollow and is formed on a second side of the base plate opposite that of the one or more holder frames, wherein the airflow channels of the one or more holder frames merge into a common airflow channel formed within the hollow portion of the fan mount body, and wherein the blower fan is attached at a rear portion of the fan mount body, wherein the blower fan is configured to blow air through the common airflow channel of the fan mount body and into the airflow channel of one or more of the one or more holder frames.

10. The system of claim 1, further comprising a power source for providing power to the blower fan and heater.

11. The system of claim 10, further comprising one or more of a timer relay and/or a light, wherein the power source further provides power to the one or more of the timer relay and/or light.

12. The system of claim 10, wherein the power source comprises at least one of a battery pack and/or a remote power source.

13. The system of claim 10, further comprising a controller, wherein the controller is configured to control operations of one or more of the power source, the blower fan, the heater, a timer relay, and/or a light.

14. The system of claim 9, wherein the fan mount body further comprises a first attachment mating portion, and wherein the first attachment mating portion is configured to engage with a corresponding one of a second attachment mating portion of the attachment mechanism.

15. The system of claim 14, wherein the first attachment mating portion comprises first locking features, and wherein the first locking features are configured to engage with corresponding ones of second locking features of the second attachment mating portion, and wherein when the first locking features are engaged with the corresponding ones of the second locking features the first attachment mating portion and the second attachment mating portion are locked in place relative to one another, and when the first locking features are not engaged with the corresponding ones of the second locking features the first attachment mating portion and the second attachment mating portion are rotatable about one another.

16. The system of claim 14, wherein the first locking features comprise one of dimples or bumps and the second locking feature comprises another of the one of corresponding dimples or bumps, and wherein the dimples or bumps are arranged in a circular line.

17. The system of claim 1, further comprising a desiccant pack holder, wherein the desiccant pack holder is arranged in proximity to the airflow channels of the one or more holder frames.

18. The system of claim 13, further comprising a communications interface, wherein the communications interface is configured for wireless communication with a portable smart device, and wherein the portable smart device is configured to run an application, and wherein the application is configured to interact with one or more of the controller, timer relay, power source, blower fan, heater, and/or light and control the operations thereof.

19. A method of using a portable drying system, the method comprising:
 a. providing a portable drying system, comprising:
  i. a base plate;
  ii. one or more holder frames disposed on a first side of the base plate, wherein each of the one or more holder frames define an airflow channel therethrough, each airflow channel extending through the base plate;
  iii. a blower fan disposed at a second side of the base plate opposite that of the one or more holder frames, wherein the blower fan is configured to blow air into the airflow channel of one or more of the one or more holder frames;
  iv. a heater mounted in-line with the blower fan, wherein the heater is one of upstream or downstream of the blower fan and is configured to provide radiant heat to one or more articles installed on one or more of the one or more holder frames; and
  v. an attachment mechanism, wherein the attachment mechanism is configured to attach the portable drying system to another structure;
 b. attaching the portable drying system to a structure;
 c. installing one or more articles to be dried on the one or more holder frames; and
 d. activating either or both of the blower fan and heater.

20. A portable drying system, comprising:
 a. a base plate;
 b. two holder frames disposed on a first side of the base plate, wherein each of the two holder frames include an airflow channel defined therethrough;
 c. a fan mount body, wherein the fan mount body is at least partially hollow and is formed on a second side of the base plate opposite that of the one or more holder frames, wherein the airflow channel of each of the two holder frames merge into a common airflow channel formed within the hollow portion of the fan mount body;
 d. a blower fan attached at a rear portion of the fan mount body, wherein the blower fan is configured to blow air through the common airflow channel of the fan mount body and into either or both of the airflow channels of the two holder frames;
 e. a heater mounted in-line with the blower fan, wherein the heater is one of upstream or downstream of the blower fan, wherein the heater is configured to provide radiant heat to one or more articles installed on either or both of the two holder frames;
 f. a power source configured to provide power to either or both of the blower fan and heater; and
 g. an attachment mechanism, wherein the attachment mechanism is configured to attach the portable drying system to another structure.

21. The system of claim 20, further comprising a timer relay, wherein the timer relay is in communication with either or both of the blower fan and heater, and is configured to control a time of operation of either or both of the blower fan and heater.

* * * * *